(12) United States Patent
Ohtsuji

(10) Patent No.: US 12,052,062 B2
(45) Date of Patent: Jul. 30, 2024

(54) TRANSMISSION APPARATUS RECOGNITION APPARATUS, TRANSMISSION APPARATUS RECOGNITION SYSTEM, TRANSMISSION APPARATUS RECOGNITION METHOD, AND COMPUTER READABLE MEDIUM

(71) Applicant: NEC Corporation, Tokyo (JP)

(72) Inventor: Taichi Ohtsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 340 days.

(21) Appl. No.: 17/637,116

(22) PCT Filed: Oct. 8, 2019

(86) PCT No.: PCT/JP2019/039660
§ 371 (c)(1),
(2) Date: Feb. 22, 2022

(87) PCT Pub. No.: WO2021/070248
PCT Pub. Date: Apr. 15, 2021

(65) Prior Publication Data
US 2022/0345230 A1 Oct. 27, 2022

(51) Int. Cl.
*H04B 17/10* (2015.01)
*G06N 5/022* (2023.01)
*H04W 24/08* (2009.01)

(52) U.S. Cl.
CPC ............ *H04B 17/10* (2015.01); *G06N 5/022* (2013.01)

(58) Field of Classification Search
CPC ....... H04B 17/10; H04B 17/19; H04W 24/08; G06N 5/022; G06N 20/00; G06F 2218/12; G06F 18/00
See application file for complete search history.

(56) References Cited

U.S. PATENT DOCUMENTS 10,542,930 B1 * 1/2020 Sanchez ............... A61B 5/4818
10,769,929 B2 * 9/2020 Qiu ...................... G08B 21/182
(Continued)

FOREIGN PATENT DOCUMENTS

| JP | 5757295 B | 7/2015 |
| JP | 2017-117406 A | 6/2017 |
| JP | 2018-010703 A | 1/2018 |

OTHER PUBLICATIONS

Japanese Office Communication for JP Application No. 2021-550974 mailed on Oct. 4, 2022 with English Translation.
(Continued)

*Primary Examiner* — Andrew Wendell
(74) *Attorney, Agent, or Firm* — Sughrue Mion, PLLC

(57) ABSTRACT

The present invention improves efficiency of operator's work by automating template registration of an unregistered transmission apparatus. A transmission apparatus recognition apparatus includes a receiving unit, a recognition unit, and a template feature registration unit. The receiving unit receives a signal wirelessly transmitted from a transmission apparatus. The recognition unit calculates a degree of similarity between a sample feature generated from a received signal received by the receiving unit and template features registered in advance, compares the degree of similarity with recognition threshold value, and thereby recognizes the transmission apparatus. The template feature registration unit generates a template feature from a sample feature that failed to be recognized by the recognition unit.

15 Claims, 13 Drawing Sheets

(56) References Cited

U.S. PATENT DOCUMENTS

| | | | |
|---|---|---|---|
| 2004/0165755 A1* | 8/2004 | Hillhouse | G06F 21/32 |
| | | | 382/124 |
| 2015/0063135 A1* | 3/2015 | Park | H04W 24/08 |
| | | | 370/252 |
| 2015/0063686 A1* | 3/2015 | Iwasaki | G06F 16/5838 |
| | | | 382/159 |
| 2015/0269422 A1* | 9/2015 | Wada | G06V 40/173 |
| | | | 382/118 |
| 2017/0186201 A1 | 6/2017 | Obayashi et al. | |

OTHER PUBLICATIONS

Ohtsuji, Taichi et al., "Noise-tolerant, Deep-learning-based Radio Identification with Logarithmic Power Spectrum", 2019 IEEE International Conference on Communications (ICC), 2019.

International Search Report for PCT Application No. PCT/JP2019/039660, mailed on Nov. 19, 2019.

S. U. Rehman et al., "Analysis of Receiver Front End on the Performance of RF Fingerprinting, " 2012 IEEE International Symposium on Personal, Indoor, and Mobile Radio Communications (PIMRC), 2012, pp. 1-6.

Ohtsuji et al., "An evaluation of propagation loss on wireless physical layer identification", IEICE Technical Report, No. 124, SR2018-25, Jul. 2018, pp. 43-49.

Khalid Youssef et al., "Machine Learning Approach to RF Transmitter Identification", IEEE Journal of Radio Frequency Identification, vol. 2. Issue 4, IEEE 2018.11, pp. 197-205.

* cited by examiner

TRANSMISSION APPARATUS RECOGNITION APPARATUS, TRANSMISSION APPARATUS RECOGNITION SYSTEM, TRANSMISSION APPARATUS RECOGNITION METHOD, AND COMPUTER READABLE MEDIUM

This application is a National Stage Entry of PCT/JP2019/039660 filed on Oct. 8, 2019, the contents of all of which are incorporated herein by reference, in their entirety.

TECHNICAL FIELD

The present disclosure relates to a transmission apparatus recognition apparatus, a transmission apparatus recognition system, a transmission apparatus recognition method, and a non-transitory computer readable medium in which a program is stored.

BACKGROUND ART

Techniques for determining a wireless terminal apparatus (hereinafter, simply referred to as a wireless terminal) such as a mobile terminal apparatus have been proposed.

For example, Non Patent Literature 1 describes a radio identification system in which a receiver determines (identifies) a wireless terminal based on the characteristics of a signal received from the wireless terminal. This radio identification system converts the waveform of a known signal such as a preamble signal into a power spectral density. After that, the radio identification system learns the power spectral density as a feature using a machine learning algorithm such as the k-nearest neighbor algorithm, and generates an identification model. After that, the radio identification system inputs the feature extracted from a received signal into the trained model to identify which terminal transmits among the trained wireless terminals.

Normally, identification of a wireless terminal uses a supervised algorithm among machine learning algorithms. The supervised algorithm trains a model by giving a label to a feature that is to be training data in advance, such as giving a label of transmission terminal TA to a terminal and giving a label of transmission terminal TB to another terminal, and by using it as teacher data. After that, inferring the test data or the actual data with the model brings about an identification (classification) result such that a terminal is the transmission terminal TA or the transmission terminal TB. When the problem is solved as a classification problem in this way, it is necessary to learn all the wireless terminals to be determined.

Patent Literature 1 describes a radio station identification apparatus that determines a feature vector to be registered by generating a dendrogram by hierarchical cluster analysis.

CITATION LIST

Non Patent Literature

Non Patent Literature 1: S. U. Rehman, K. Sowerby, and C. Coghill, "Analysis of Receiver Front End on the Performance of RF Fingerprinting," 2012 IEEE International Symposium on Personal, Indoor, and Mobile Radio Communications (PIMRC), pp. 2494-2499, 2012.

Patent Literature

Patent Literature 1: Japanese Patent No. 5757295

SUMMARY OF INVENTION

Technical Problem

The present inventor has studied recognizing a sample obtained by quantifying a received signal with a template in a database, using a transmission apparatus recognition system that determines (recognizes) a transmission apparatus that is a wireless terminal. In such a transmission apparatus recognition system, there may be no template having a high degree of similarity to the sample, that is, there may be an unregistered terminal, at the time of operation. At this time, an operator (operator, person in charge) of the above system receives an inquiry about whether to newly register the sample in the database as a template for which there is no template having a high degree of similarity. A large number of radio signals are often transmitted from one wireless terminal (transmitting terminal) at one time. Therefore, it is desirable to register a typical feature calculated from a plurality of samples in a database as a template. However, the work, in which the operator manually selects some samples from a plurality of samples and registers the template in the database, has a problem that increases the man-hours.

For the purpose of reducing man-hours, it would be possible to automatically register all samples that are out of the recognition determination (that is, that have low degree of similarity to all templates registered in the database), into the database. However, there is a problem that excessively increases the calculation amount related to the determination process at the time of recognition. In particular, this problem becomes remarkable when the transmission apparatus recognition system is mounted on an apparatus such as an edge device that requires low cost and low power consumption. Furthermore, there is a problem that lowers the recognition accuracy when a sample having an outlier due to an effect of noise or instantaneous fading is present in the database, as a template.

As described above, a radio identification system such as Non Patent Literature 1 generally needs to learn all the transmission terminals (wireless terminals) to be determined in order to identify (classify) a transmission terminal (wireless terminal). If the number of wireless terminals to be determined is within a limited range, there is no problem in learning all of them. However, when it is expected that the number of wireless terminals to be determined increases, or when the number of wireless terminals cannot be defined (specified) in the first place, it is difficult to learn the features of these wireless terminals by machine learning in advance. This is because when the feature of an unlearned wireless terminal is input to a learned model, the feature is erroneously classified to one of the closest wireless terminals among the learned wireless terminals. Therefore, applying the technique disclosed in Non Patent Literature 1 cannot solve the above-described problems regarding the transmission apparatus recognition system.

On the other hand, the radio station identification apparatus of Patent Literature 1 determines feature vectors to be registered based on the cluster analysis, which is a kind of unsupervised learning. Although not specified in Patent Literature 1, it is presumed that this radio station identification apparatus can mainly target narrowband signals with analog modulation. However, it has been empirically found that cluster analysis does not give appropriate results for wideband signals with digital modulation. In other words, applying the technique disclosed in Patent Literature 1 to recent digital radio signals cannot solve the above-described problem with the transmission apparatus recognition system.

In view of the above-mentioned problems, it is an object of the present disclosure to provide a transmission apparatus recognition apparatus, a transmission apparatus recognition system, a transmission apparatus recognition method, and a computer readable medium, capable of automating a template registration of an unregistered transmission apparatus to improve the efficiency of work of an operator.

Solution to Problem

A transmission apparatus recognition apparatus according to a first aspect of the present disclosure includes: a receiving unit (receiving means) for receiving a signal wirelessly transmitted from a transmission apparatus; a recognition unit (recognition means) for recognizing the transmission apparatus by calculating a degree of similarity between a sample feature generated from the received signal received by the receiving unit and a template feature registered in advance and by comparing the degree of similarity with a recognition threshold value; and a template feature registration unit (template feature registration means) for generating a template feature from a sample feature that has failed to be recognized by the recognition unit.

A transmission apparatus recognition method according to a second aspect of the present disclosure is a transmission apparatus recognition method in a transmission apparatus recognition apparatus including a receiving unit (receiving means) for receiving a signal wirelessly transmitted from a transmission apparatus, the method including: a recognition step for recognizing the transmission apparatus by calculating a degree of similarity between a sample feature generated from a received signal received by the receiving unit and a template feature registered in advance and by comparing the degree of similarity with a recognition threshold value; and a registration step for generating a template feature from a sample feature that failed to be recognized in the recognition step.

A non-transitory computer readable medium according to a third aspect of the present disclosure is a medium storing a program for causing a computer, including a receiving unit (receiving means) for receiving a signal wirelessly transmitted from a transmission apparatus, to execute: a recognition step for recognizing the transmission apparatus by calculating a degree of similarity between a sample feature generated from a received signal received by the receiving unit and a template feature registered in advance and by comparing the degree of similarity with a recognition threshold value; and a registration step for generating a template feature from a sample feature that failed to be recognized in the recognition step.

Advantageous Effects of Invention

According to the present disclosure, it is possible to provide a transmission apparatus recognition apparatus, a transmission apparatus recognition system, a transmission apparatus recognition method, and a computer readable medium, capable of automating a template registration of an unregistered transmission apparatus to improve the efficiency of work of an operator. Note that, according to the present disclosure, other effects may be exhibited in place of or in combination with such effects.

DESCRIPTION OF EMBODIMENTS

Figure 1:
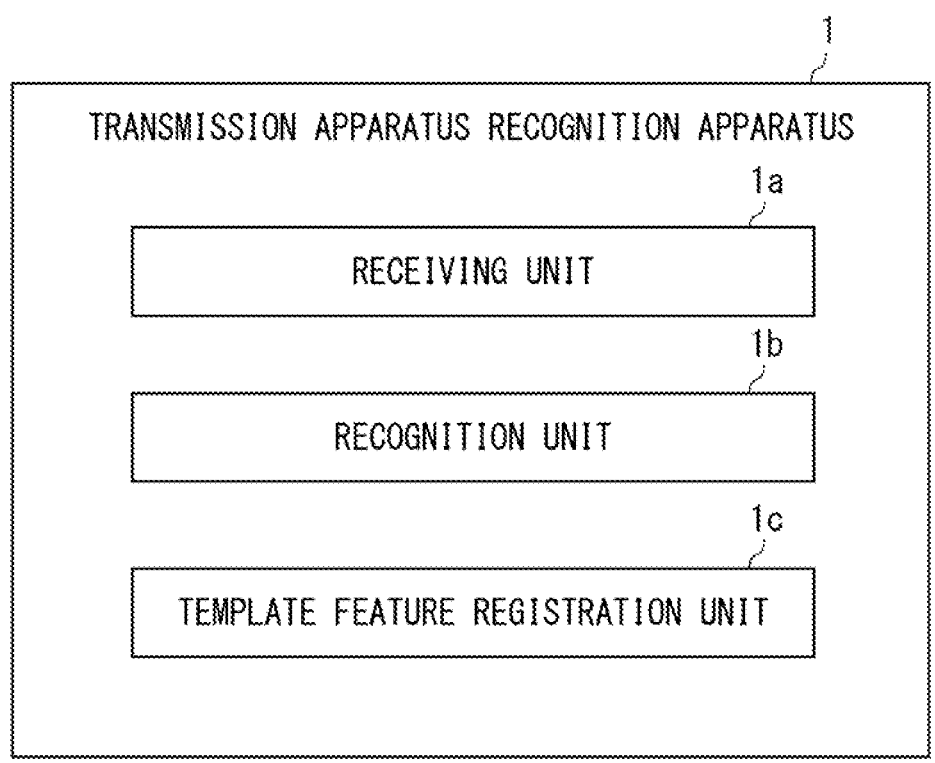
FIG. 1 is a block diagram showing a configuration example of a transmission apparatus recognition apparatus according to a first example embodiment.

Hereinafter, example embodiments will be described with reference to the drawings. In the present specification and drawings, elements that can be described in the same manner may be designated by the same reference signs so that duplicate description may be omitted. In addition, there is a drawing that draws a one-way arrow in the drawings to be described below, but this arrow simply indicates the direction of the flow of a certain signal (data), and does not exclude bidirectionality.

First Example Embodiment

A first example embodiment will be described with reference to FIG. 1. FIG. 1 is a block diagram showing a configuration example of a transmission apparatus recognition apparatus according to the first example embodiment.

As shown in FIG. 1, the transmission apparatus recognition apparatus 1 includes a receiving unit 1a, a recognition unit 1b, and a template feature registration unit 1c. The receiving unit 1a receives a signal wirelessly transmitted from a transmission apparatus, and may also be referred to as a wireless receiving unit. This transmission apparatus is a wireless terminal apparatus (wireless terminal) capable of wireless communication. Hereinafter, this transmitting apparatus will be referred to as a "transmission terminal" or simply a "terminal".

The recognition unit 1b calculates a degree of similarity between a sample feature generated from the received signal received by the receiving unit 1a and a template feature registered in advance, and compares the degree of similarity with a recognition threshold value to recognize the transmission terminal. Where the template feature is registered may be a storage apparatus provided as a template feature storage unit in the recognition unit 1b, but may be a storage apparatus external to the transmission apparatus recognition apparatus 1.

The template feature registration unit 1c generates a template feature from the sample feature that has failed to be recognized by the recognition unit 1b. The sample feature that has failed to be recognized basically refers to a sample feature whose degree of similarity is lower than the recognition threshold value, and the following disclosure will be described assuming such processing by the threshold value.

The template feature registration unit 1c can temporarily hold (store, accumulate) the sample features that have failed to be recognized by the recognition unit 1b, and generate a template feature from the held sample features. In addition, the template feature registration unit 1c registers the generated template feature in the above registration destination.

As described above, the transmission apparatus recognition apparatus 1 according to this example embodiment is an apparatus that recognizes a transmission source using a signal wirelessly transmitted from a transmission terminal (radio wave received from the transmission terminal), and can also be referred to as a radio wave sensor apparatus or a recognition processing apparatus. One of the main features of this example embodiment is that the transmission apparatus recognition apparatus 1 collects typical features generated from a plurality of sample features that have failed to be recognized (but have a high degree of similarity within them), as a template feature.

As a result, according to this example embodiment, in an environment in which there can be an unspecified large number of unregistered transmission terminals to be recognized, it is possible to obtain effects of preventing increase in man-hours of the operator by automating the registration, preventing increase in the calculation amount at the time of recognition, and improving the robustness. In particular, according to this example embodiment, automating the template registration of the unregistered transmission terminals can improve the efficiency of the operator's work.

Second Example Embodiment

Figure 2:
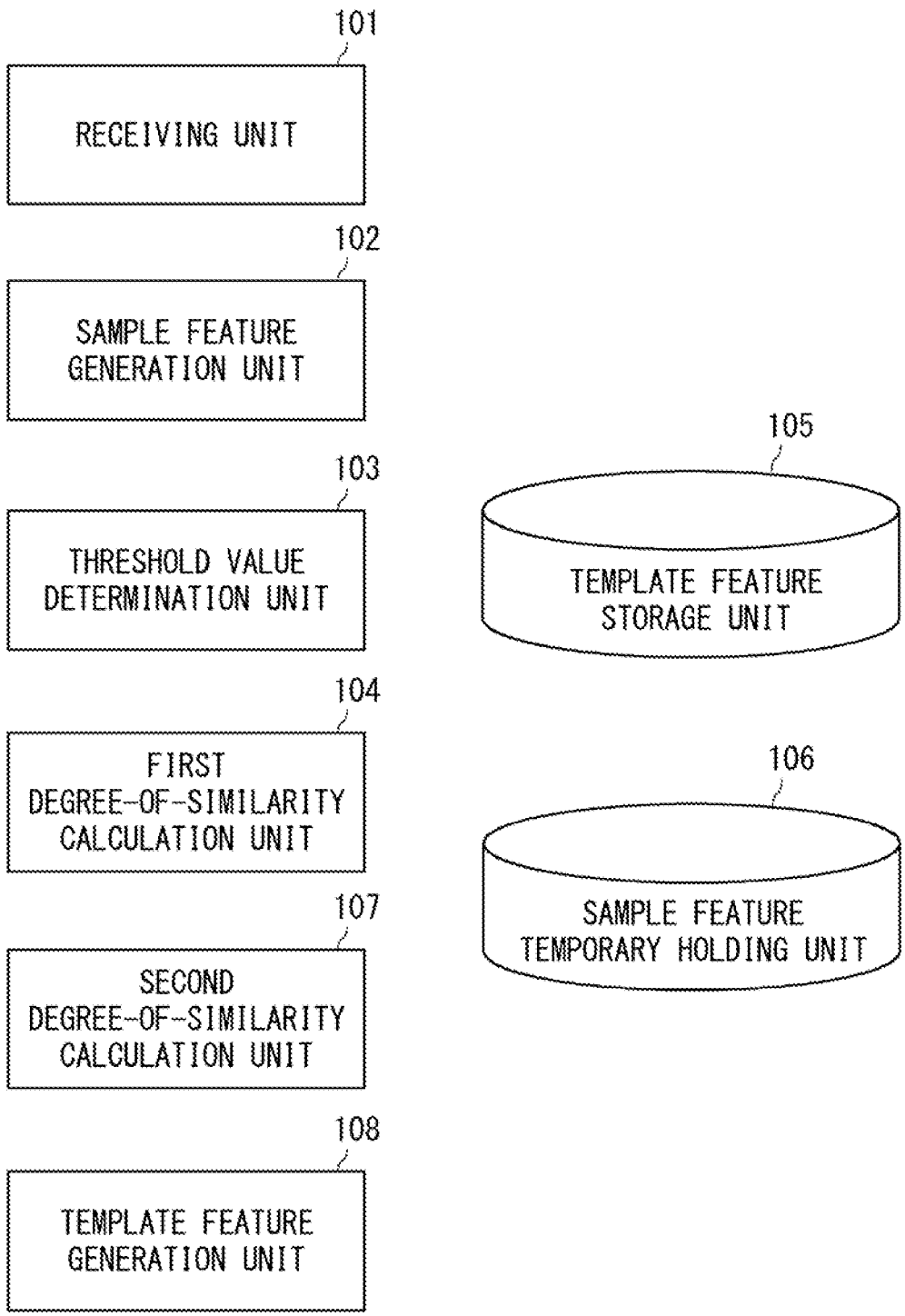
FIG. 2 is a block diagram for explaining an outline of a transmission apparatus recognition apparatus according to a second example embodiment.

A second example embodiment will be described focusing on differences from the first example embodiment with reference to FIGS. 2 to 10. Also, in the second example embodiment, various examples described in the first example embodiment can be applied. First, an outline of a transmission apparatus recognition apparatus according to the second example embodiment will be described with reference to FIG. 2. FIG. 2 is a block diagram for explaining the outline of the transmission apparatus recognition apparatus according to the second example embodiment. Note that the reference numerals of the drawing added to this outline are added to each element for convenience as an example for assisting understanding, and the description of this outline is not intended to limit anything.

As shown in FIG. 2, the transmission apparatus recognition apparatus 10 according to this example embodiment includes a receiving unit 101 corresponding to the receiving unit 1a of FIG. 1, and can also include the following components. Specifically, the transmission apparatus recognition apparatus 10 includes a sample feature generation unit 102, a threshold value determination unit 103, a first degree-of-similarity calculation unit 104, a template feature storage unit 105, a sample feature temporary holding unit 106, a second degree-of-similarity calculation unit 107, and a template feature generation unit 108.

The receiving unit 101 receives a signal from a transmission terminal. The sample feature generation unit 102 generates a sample feature from the received signal received by the receiving unit 101. The threshold value determination unit 103 determines a recognition threshold value and a registration threshold value based on a predetermined target error rate. Although not shown, the threshold value determination unit 103 may have a recognition threshold value determination unit and a registration threshold value determination unit. The threshold value determination unit 103 preferably determines both the recognition threshold value and the registration threshold value, but it may be configured to determine either one.

The first degree-of-similarity calculation unit 104 calculates a degree of similarity of 1 to N between the above sample feature of the received signal and the template features registered in the database in the template feature storage unit 105, and outputs a recognition result based on the above recognition threshold value. Note that N is a value indicating the number of registered template features, and is a positive integer. The template feature storage unit 105 can store the template feature as a database.

Here, the first degree-of-similarity calculation unit 104 outputs the registered data (such as identification information of the registered transmission terminal) when the calculated degree of similarity is greater than the recognition threshold value (which means the same when it is equal to or greater than the recognition threshold value. The same applies hereinafter.). On the other hand, the first degree-of-similarity calculation unit 104 temporarily stores the above sample feature in the sample feature temporary holding unit 106 when there is no transmission terminal whose calculated degree of similarity is greater than the recognition threshold value.

The sample feature temporary holding unit 106 temporarily holds (temporarily stores) the sample feature whose degree of similarity is equal to or less than the recognition threshold value. The second degree-of-similarity calculation unit 107 calculates the degrees of similarity between the temporarily stored sample features every predetermined period of time, and groups those whose degree of similarity are equal to or greater than the above registration threshold value (which means the same when it is greater than the registration threshold value. The same applies hereinafter.). Calculating the degrees of similarity between sample features means calculating the degree of similarity of M to M−1. Note that M is a value indicating the number of sample features temporarily stored, and is an integer of 2 or more. The calculation of the degree of similarity of M to M−1 will be described. This calculation includes the calculation of the degree-of-similarity score between one sample feature and another M−1 sample features when M sample features are held in the sample feature temporary holding unit 106, and there are M ways of the calculations. Therefore, the degree of similarity calculation of M to M−1 means M×(M−1) times of degree of similarity calculation. The second degree-of-similarity calculation unit 107 calculates the degrees of similarity between the sample features whose similarity calculated by the first degree-of-similarity calculation unit 104 are equal to or less than the recognition threshold value, and compares the calculated degrees of similarity with the registration threshold value. In any group, the degree of similarity is calculated when the group includes two or more sample features.

The above predetermined period of time can be determined as an upper limit value of the accumulated number, but can also be determined as a value indicating the elapsed time. Specifically, the predetermined period of time can be a predetermined time or a predetermined number of sample features, and can also be a period satisfying other predetermined conditions. For example, when the accumulated number of the sample features temporarily stored becomes a sufficient number, the second degree-of-similarity calculation unit 107 can calculate the degrees of similarity between the sample features, to group sample features with degree of similarity equal to or greater than the registration threshold value into the same group.

The template feature generation unit 108 generates a template feature from a plurality of sample features in the above group, and stores the generated template feature in the database in the template feature storage unit 105 to register it.

Then, in an environment in which an unspecified large number of transmission terminals unregistered in databases can transmit, it is possible to obtain effects of preventing increase in man-hours of the operator, preventing increase in the calculation amount at a time of recognition, and improving the robustness.

Furthermore, in this example embodiment, the sample feature generation unit 102 generate a sample feature by using a learned model of learning with signals received under a limited environment in which only specific transmission terminals transmit radio waves. In addition, the threshold value determination unit 103 can use such a learned model to determine the recognition threshold value used for recognition and the registration threshold value used for database registration.

Figure 3:
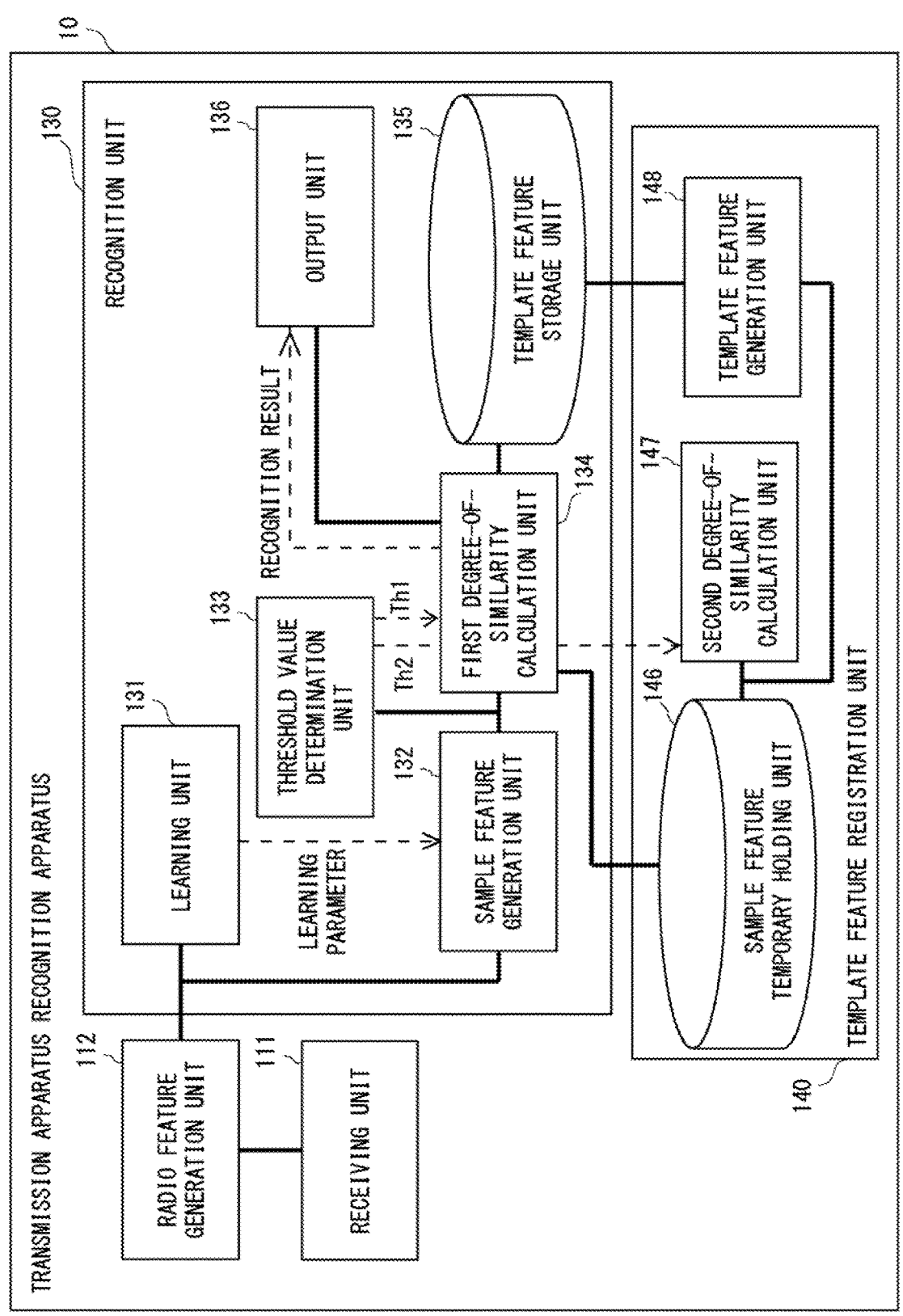
FIG. 3 is a block diagram showing an example of a functional configuration of the transmission apparatus recognition apparatus according to the second example embodiment.
Figure 4:
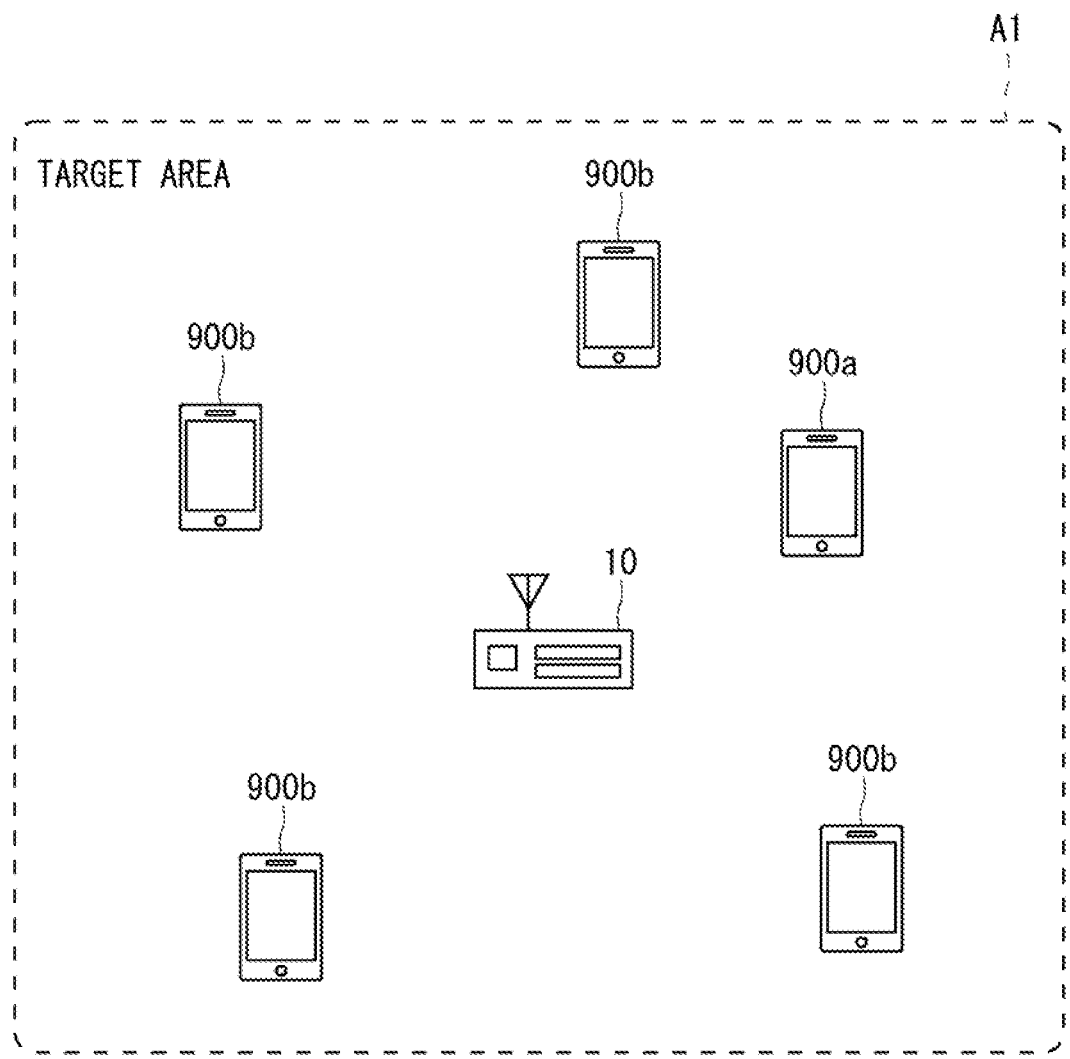
FIG. 4 is a diagram showing an arrangement example of the transmission apparatus recognition apparatus according to the second example embodiment.

Hereinafter, a more specific example of this example embodiment will be described in detail with reference to FIGS. 3 to 10. First, an example of the configuration and arrangement of the transmission apparatus recognition apparatus 10 will be described with reference to FIGS. 3 and 4. FIG. 3 is a block diagram showing an example of a functional configuration of the transmission apparatus recognition apparatus 10, and FIG. 4 is a diagram showing an arrangement example of the transmission apparatus recognition apparatus 10. Note that, of the components shown in FIG. 3, those having the same names as the components described in FIG. 2 have basically the same functions.

The transmission apparatus recognition apparatus 10 shown in FIG. 3 calculates the degree of similarity between the sample feature generated based on the individual difference of the radio wave transmitted by the transmission terminal (not shown) and the template feature registered in advance in the internal database, to recognize the transmission terminal. Note that "recognize" can be expressed in a different word such as "identify", "determine", or "decide".

Here, the individual difference in radio waves and the like will be described. Individual differences may occur in the radio waves to be transmitted due to differences in the specifications of the transmission terminal, or even if the specifications are the same, due to variations in the characteristics of the analog circuit mounted on the transmission terminal. For each transmission terminal, the transmission apparatus recognition apparatus 10 registers the feature of the radio wave transmitted by the transmission terminal as a template feature in the database. Then, when the transmission apparatus recognition apparatus 10 receives the radio wave, it generates a sample feature of the received signal. The transmission apparatus recognition apparatus 10 calculates the degree of similarity between the sample feature and the template features in the database, and determines the transmission terminal that transmits the received radio waves when there is a terminal having a template feature equal to or greater than a predetermined threshold value. When there are a plurality of terminals each having a template feature equal to or greater than a predetermined threshold value, the greatest one is output as a recognition result. Alternatively, a predetermined number of or less candidates may be output together with the estimated probability, in which the predetermined number is 2 or more.

The recognition of the transmission terminal includes "individual identification" that determines the individual of the transmission terminal. In addition, the determination of the transmission terminal also includes "model identification" that does not determine which individual transmits the radio wave but that determines the model that transmits the radio wave. In view of this situation, in the following description, "individual identification" and "model identification" may be collectively referred to as "radio identification" or "terminal recognition".

The transmission apparatus recognition apparatus 10 is required to be capable of extracting the feature of the received radio wave (received radio signal), and the transmission terminal need not transmit radio waves to the transmission apparatus recognition apparatus 10 (toward the transmission apparatus recognition apparatus 10). The transmission apparatus recognition apparatus 10 can be utilized (applied) for various purposes such as detection and tracking of suspicious persons in urban areas and various facilities (airports, shopping malls, etc.), understanding the lines of flow of customers in stores and commercial facilities, and entrance/exit management to limited areas using radio waves.

The transmission apparatus recognition apparatus 10 can determine the identity of the transmission terminal by using the feature of the radio wave. However, the transmission apparatus recognition apparatus 10 cannot directly determine the owner of the transmission terminal based on the feature. As described above, the feature of the radio wave used by the transmission apparatus recognition apparatus 10 has anonymity, and the transmission apparatus recognition apparatus 10 can perform processing in consideration of the privacy of individuals.

Hereinafter, each component of the transmission apparatus recognition apparatus 10 shown in FIG. 3 will be described.

As shown in FIG. 3, the transmission apparatus recognition apparatus 10 can include a receiving unit 111, a radio feature generation unit 112, a recognition unit 130, and a template feature registration unit 140.

The receiving unit 111 receives radio waves (radio signals) from transmission terminals including the transmission terminal that is the target of radio identification. Here, the number of receiving units 111 included in the transmission apparatus recognition apparatus 10 is required to be one or more. In other words, the transmission apparatus recognition apparatus 10 may include at least one receiving unit 111.

Here, an arrangement example of the transmission apparatus recognition apparatus 10 including the receiving unit 111 and the transmission terminal will be described with reference to FIG. 4. In the example of FIG. 4, there are shown the transmission apparatus recognition apparatus 10 and the transmission terminals 900a and 900b arranged in a target area A1 of the terminal recognition by the transmission apparatus recognition apparatus 10. Here, the transmission terminal 900a is a transmission terminal to be recognized by the transmission apparatus recognition apparatus 10, and the transmission terminals 900b are transmission terminals not to be recognized by the transmission apparatus recognition apparatus 10. In the present disclosure, unless there is a particular reason for distinguishing between the transmission terminal 900a and the transmission terminal 900b, they are simply referred to as "transmission terminal 900". Note that, although FIG. 4 illustrates one transmission terminal 900a to be recognized, actually, a plurality of transmission terminals 900a to be recognized are included. In other words, there are at least one or more transmission terminals 900a in the field (target area).

Examples of the transmission terminal 900 include mobile terminal apparatuses such as mobile phones (including those called smartphones), game machines, and tablet terminals, and computers (personal computers, laptop computers). Alternatively, examples of the transmission terminal 900 may include an IoT (Internet of Things) terminal, and an MTC (Machine Type Communication) terminal that transmit radio waves. However, the transmission terminals 900 (including the target of terminal recognition by the transmission apparatus recognition apparatus 10) is not limited to the above examples. In other words, in the present disclosure, any apparatus that transmits radio waves can be a target of terminal recognition by the transmission apparatus recognition apparatus 10.

As described above, the radio wave transmitted by the transmission terminal 900a need not to be the radio wave transmitted to the transmission apparatus recognition apparatus 10 (to the receiving unit 111). For example, the receiving unit 111 may receive radio waves transmitted by the transmission terminal 900 toward a wireless communication base station or an access point for a mobile phone or the like, or radio waves transmitted by the transmission terminal 900 to search for wireless communication base stations and access points.

Furthermore, it is assumed that the transmission apparatus recognition apparatus 10 is installed in an environment in which an unspecified large number of transmission terminals, whose template features are unregistered in the database, can transmit. In such an installation environment, the operator who operates the transmission apparatus recognition apparatus 10 may have difficulty in manually registering the sample feature of a signal transmitted by a specific transmission terminal 900a in the database, as a new template feature. Especially in an environment in which the number of unregistered terminals is large, the problem may become remarkable. At this time, automatically registering all the sample features that has deviated from the recognition determination (has failed to be recognized) in the database may lead to an excessive increase in the calculation amount at the time of recognition. In addition, if sample features that are outliers due to the effects of noise and instantaneous fading remain in the database as they are, the recognition accuracy may decrease.

So, the transmission apparatus recognition apparatus 10 according to this example embodiment uses sample features that are below the recognition threshold value in the recognition determination in the recognition unit 130, to generates a typical template feature from a plurality of sample features in the template feature registration unit 140. Then, the template feature registration unit 140 registers such a typical template feature in the database.

The description will return to the details of the individual units of FIG. 3. The radio feature generation unit 112 generates a radio feature from the received signal received by the receiving unit 111. The radio feature used by the transmission apparatus recognition apparatus 10 for recognition of the transmission terminal of the radio wave transmission source can be various features in which individual differences of the transmission terminal 900 appear.

Examples of the radio feature include the transient (rising, falling) of the received signal in the receiving unit 111, the power spectral density of the reference signal portion such as the preamble, and the error vector amplitude of the received signal. Other examples of the radio feature include IQ phase (in-phase and quadrature phase) error, and IQ imbalance amount. Alternatively, the radio features to be used may include a feature indicating one or more of the frequency offsets and the symbol clock error. However, the examples of the radio feature here are not intended to limit the features used by the transmission apparatus recognition apparatus 10 to determine the transmission terminal.

The recognition unit 130 can include a learning unit 131, a sample feature generation unit 132, a threshold value determination unit 133, a first degree-of-similarity calculation unit 134, a template feature storage unit 135, and an output unit 136.

The recognition unit 130 has the function of the recognition unit 1b in FIG. 1. Specifically, the recognition unit 130 calculates the degree of similarity between the sample feature generated from the received signal received by the receiving unit 111 and the template feature registered in advance, and compares the degree of similarity with the recognition threshold value. The recognition unit 130 thereby recognizes the transmission terminal and outputs the recognition result. The template feature registered in advance is a template feature stored as a database in the template feature storage unit 135.

In this way, the recognition unit 130 performs terminal recognition (individual identification, model identification) based on the generated feature. This recognition process is carried out by the first degree-of-similarity calculation unit 134. Specifically, the first degree-of-similarity calculation unit 134 calculates the degree of similarity of 1 to N between the sample feature and the template feature registered in advance, and compares each of the calculated N degrees of similarity (such as the degree-of-similarity scores) with the recognition threshold value, to perform recognition. However, when one degree of similarity exceeding the recognition threshold value is present during calculation of the degree of similarity, the recognition can be considered to be successful so that the recognition process can finish. Here, the output of the recognition result by the first degree-of-similarity calculation unit 134 is carried out by the output unit 136.

Furthermore, it can be expected that combining a plurality of radio features, that is, increasing the dimension of the features improves the recognition accuracy. On the other hand, the calculation amount of recognition may increase, or the database may enlarge. Therefore, the sample feature generation unit 132, which will be described later, extracts a lower-dimensional sample feature from the higher-dimensional radio feature generated by the radio feature generation unit 112, and thereby generates a sample feature.

In particular, the sample feature generation unit 132 can generate a sample feature from the radio feature using the learned model when the receiving unit 111 receives a signal. This learned model is a model for extracting a sample feature from the radio feature generated by the radio feature generation unit 112, and is generated by the learning unit 131.

Here, the learning unit 131 trains a classifier with a feature with an appropriate label acquired in an environment in which only a sufficient number of specific transmission terminals transmit radio waves, in advance. Specifically, in an ideal environment (an environment in which there is no terminal other than the terminal to be learned), the classifier learns the relationship between the transmission terminal and the radio feature of the signal transmitted by the terminal in advance, and generates a classification model. Then, the learning parameters of the classification model are set for the classifier used as the feature extractor, that is, for the sample feature generation unit 132. For example, in the example of FIG. 4, a classification model is generated using radio waves (signals) transmitted by the transmission terminal 900a in an environment in which there is no transmission terminal 900b. The learning parameters can be, for example, a network configuration, weights, biases, and the like. However, the learning parameter may be any parameter that expresses the learned model.

More specifically, the learning unit 131 performs machine learning using teacher data with labels attached to radio features to generate the above classification model (discriminator). Generation of the classification model by the learning unit 131 can use any machine learning and deep learning algorithms such as support vector machines, boosting and neural networks. Since a known technique can be used for the algorithm such as the support vector machine described above, the description thereof will be omitted. Alternatively, the dimension of the feature may be lowered by principal component analysis for the feature of unsupervised learning.

The above-described label represents a transmission terminal (wireless terminal), and can be, for example, a model name, an individual ID, a serial number, and the like. In other words, the label is information for identifying and determining the transmission terminal. When the machine learning constructs a classification model, it is necessary to give a combination of features and correct labels as a learning data set.

The first degree-of-similarity calculation unit 134 calculates the degree of similarity of 1 to N by using sample features generated by sample feature generation unit 132 and template features registered in the template feature storage unit 135 (which is also called database), and thereby calculates the degree of similarity (the first degree of similarity). When there is a terminal with a template feature whose first degree of similarity is greater than the recognition threshold value (when there is the terminal data in the database), the first degree-of-similarity calculation unit 134 outputs the recognition result (such as ID of the transmission terminal that transmits the determined radio wave) from the output unit 136. When there are a plurality of terminals each having a template feature whose degree of similarity is greater than a predetermined recognition threshold value, the first degree-of-similarity calculation unit 134 may output the greatest one as a recognition result, or may output a predetermined number of the terminals as the candidates, in which the predetermined number is two or more.

Examples of what is used for calculating the degree of similarity between the sample feature and the template feature may include cosine similarity, Euclidean score, correlation coefficient. Specifically, the degree of similarity calculated by the first degree-of-similarity calculation unit 134 can be any one of the cosine similarity, the Euclidean score, and the correlation coefficient, or it can be a combination of a plurality of them. Note that the degree of similarity can be calculated as a degree-of-similarity score.

Specifically, when the two N-dimensional feature vectors are $<p>=(p\_1, \ldots, p\_N)$ and $<q>=(q\_1, \ldots, q\_N)$, the cosine similarity is expressed by expression (1), the Euclidean score is expressed by expression (2), and the correlation coefficient is expressed by expression (3). Note that, here, $<p>$ is a notation of a vector of p, and $<q>$ is a notation of a vector of q for convenience. In addition, the notations of the superscript bars of p and q in the expression (3) are expressed by expressions (4) and (5), respectively.

[Expression 1]

$$S_{cos} = \frac{\sum_{i=1}^{N} p_i q_i}{\sqrt{\sum_{i=1}^{N} p_i^2} \sqrt{\sum_{i=1}^{N} q_i^2}} \quad (1)$$

$$S_{euclid} = \frac{1}{1 + \sqrt{\sum_{i=1}^{N} (p_i - q_i)^2}} \quad (2)$$

$$S_{corr} = \frac{\sum_{i=1}^{N} (p_i - \overline{p})(q_i - \overline{q})}{\sqrt{\sum_{i=1}^{N} (p_i - \overline{p})^2} \sqrt{\sum_{i=1}^{N} (q_i - \overline{q})^2}} \quad (3)$$

$$\overline{p} = \sum_{i=1}^{N} p_i \quad (4)$$

$$\overline{q} = \sum_{i=1}^{N} q_i \quad (5)$$

The degree of similarity calculation method described here is merely an example, and is not intended to limit the method used by the transmission apparatus recognition apparatus 10 to calculate the degree of similarity. Note that the explanation below is on the assumption in which: the more similar the features are, the higher (closer to 1) degree of similarity is output; and the more different the features are, the lower (closer to 0) degree of similarity is output, but the present disclosure is not limited to this.

The threshold value determination unit 133 can calculate the following curve based on the degree of similarity calculation result between the sample features generated from the labeled data set such as the dataset used for learning and the template features already registered in the template feature storage unit 135. The details will be described later, but the curve calculated here can be a false acceptance rate curve and a false rejection rate curve.

Then, the threshold value determination unit 133 can determine the recognition threshold value (Th1) used in the first degree-of-similarity calculation unit 134 for comparing the threshold values of the degree of similarity between the sample feature and the template feature, for example, based on the predetermined false acceptance rate and the target error rate for recognition. In addition, the threshold value determination unit 133 can determine the registration threshold value (Th2) used for comparing with the degrees of similarity between the sample features in the second degree-of-similarity calculation unit 147, which will be described later, for example, based on a predetermined false rejection rate and a target error rate for registration. The threshold value determination unit 133 outputs the recognition threshold value (Th1) to the first degree-of-similarity calculation unit 134, and the registration threshold value (Th2) to the second degree-of-similarity calculation unit 147. Note that FIG. 3 is drawn for convenience so that the threshold value determination unit 133 and the second degree-of-similarity calculation unit 147 are not connected, but both are connected.

Next, the template feature registration unit 140 will be described. The template feature registration unit 140 can include a sample feature temporary holding unit 146, a second degree-of-similarity calculation unit 147, and a template feature generation unit 148.

The sample feature temporary holding unit 146 is a temporary holding unit that temporarily holds the sample feature that has failed to be recognized by the recognition unit 130. In other words, the sample feature temporary holding unit 146 temporarily stores the sample features, which are out of the recognition in the first degree-of-similarity calculation unit 134 (which have had all the degrees of similarity with the registered template features less than the recognition threshold value).

The second degree-of-similarity calculation unit 147 calculates the degrees of similarity between the sample features held in the sample feature temporary holding unit 146 every predetermined period of time, and groups those whose degree of similarity are equal to or greater than the registration threshold value. Here, there may be a plurality of groups. Since the second degree-of-similarity calculation unit 147 recognizes the sample features with each other, it can also be referred to as a second recognition unit.

Also, the degree of similarity calculated by the second degree-of-similarity calculation unit 147 can be any one of the cosine similarity, the Euclidean score, and the correlation coefficient, or it can be a combination of a plurality of them. Note that this degree of similarity can also be calculated as a degree-of-similarity score.

The template feature generation unit 148 generates a template feature from the sample features held by the sample feature temporary holding unit 146. Particularly, when the above-described grouping is used, the template feature generation unit 148 generates a template feature from a plurality of sample features included in the group for each group, and registers the template features in the template feature storage unit 135. An example of how to generate a template will be described later. From the above, the template feature registration unit 140 generates a template feature of the transmission terminal that is considered to be unregistered in the template feature storage unit 135, and performs a process of newly adding the template feature.

Hereinafter, an operation example of the transmission apparatus recognition apparatus 10 with a configuration described above will be described in detail with reference to the flows of FIGS. 5 to 7 and FIGS. 8 to 10.

Figure 5:
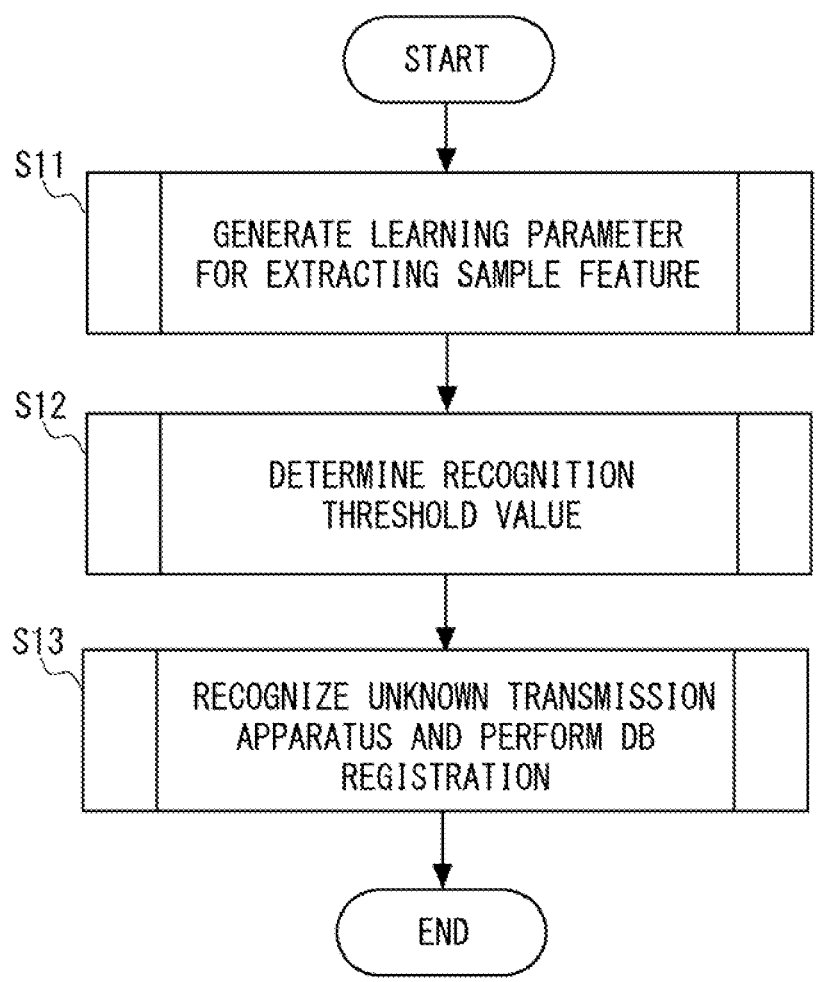
FIG. 5 is a diagram showing an overall flow of an operation example of the transmission apparatus recognition apparatus according to the second example embodiment.

FIG. 5 is a diagram showing an overall flow of an operation example of the transmission apparatus recognition apparatus 10. The transmission apparatus recognition apparatus 10 generates learning parameters for sample feature generation (step S11), determines a recognition threshold value and a registration threshold value (step S12), recognizes unknown transmission terminals, and performs data-base registration (step S13). It is desirable to carry out steps S11 and S12 before the actual operation and to carry out the step S13 at the time of the actual operation. Also in the time of the actual operation, the threshold value may be redetermined by executing step S12 once a week, once a month, or the like.

Hereinafter, the details of steps S11 to S13 will be described with reference to FIG. 6 for step S11, FIGS. 7 and 8 for step S12, and FIG. 9 for step S13.

Figure 6:
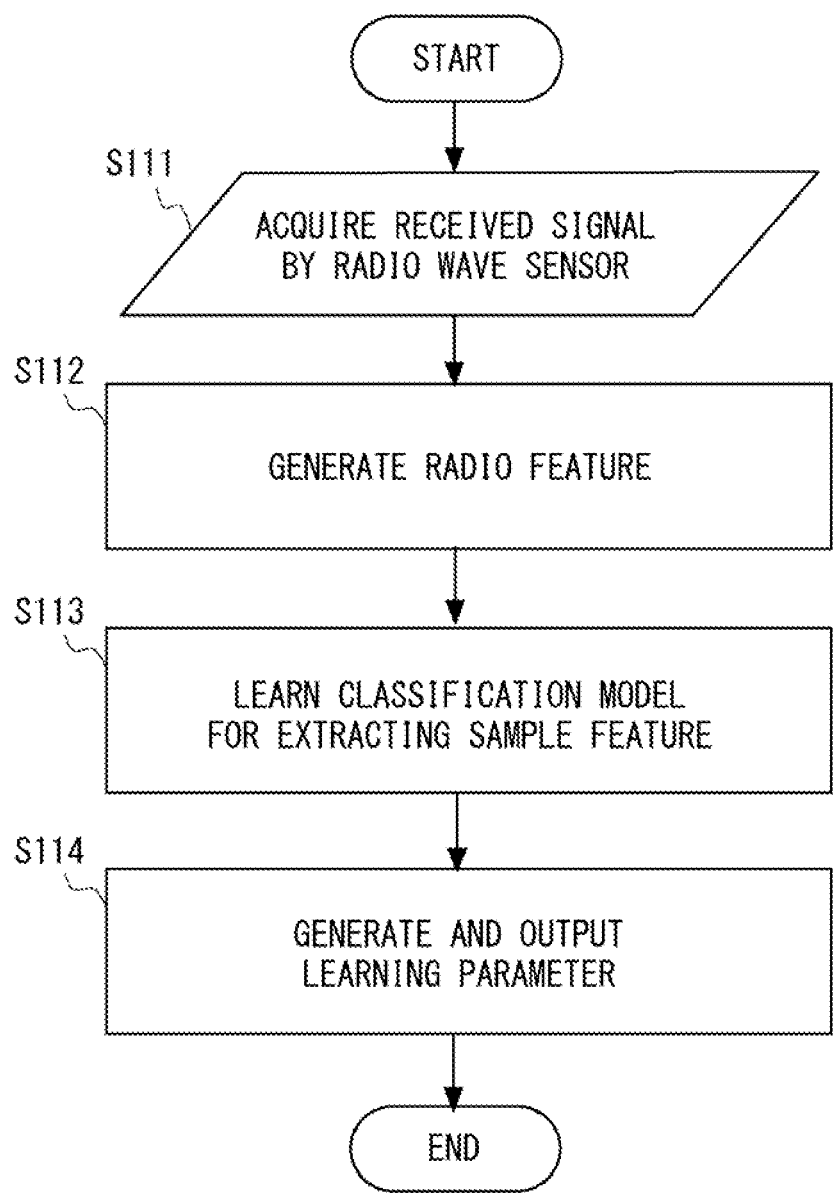
FIG. 6 is a diagram showing a processing flow related to learning parameter generation according to the second example embodiment.

FIG. 6 is a diagram showing an operation example of learning parameter generation (step S11 in FIG. 6) according to the second example embodiment. First, in an environment in which only a specific transmission terminal transmits radio waves, the transmission apparatus recognition apparatus 10 operates a receiving unit 111 having a radio wave sensor to receive a signal transmitted by the transmission terminal (step S111). Next, the radio feature generation unit 112 generates a radio feature from this received signal and gives a label of the transmission terminal to the radio feature (step S112). The learning unit 131 trains the classification model for extracting a sample feature using the radio feature to generate this classification model (step S113), and outputs the learning parameters of this classification model to the sample feature generation unit 132 (step S114).

Figure 7:
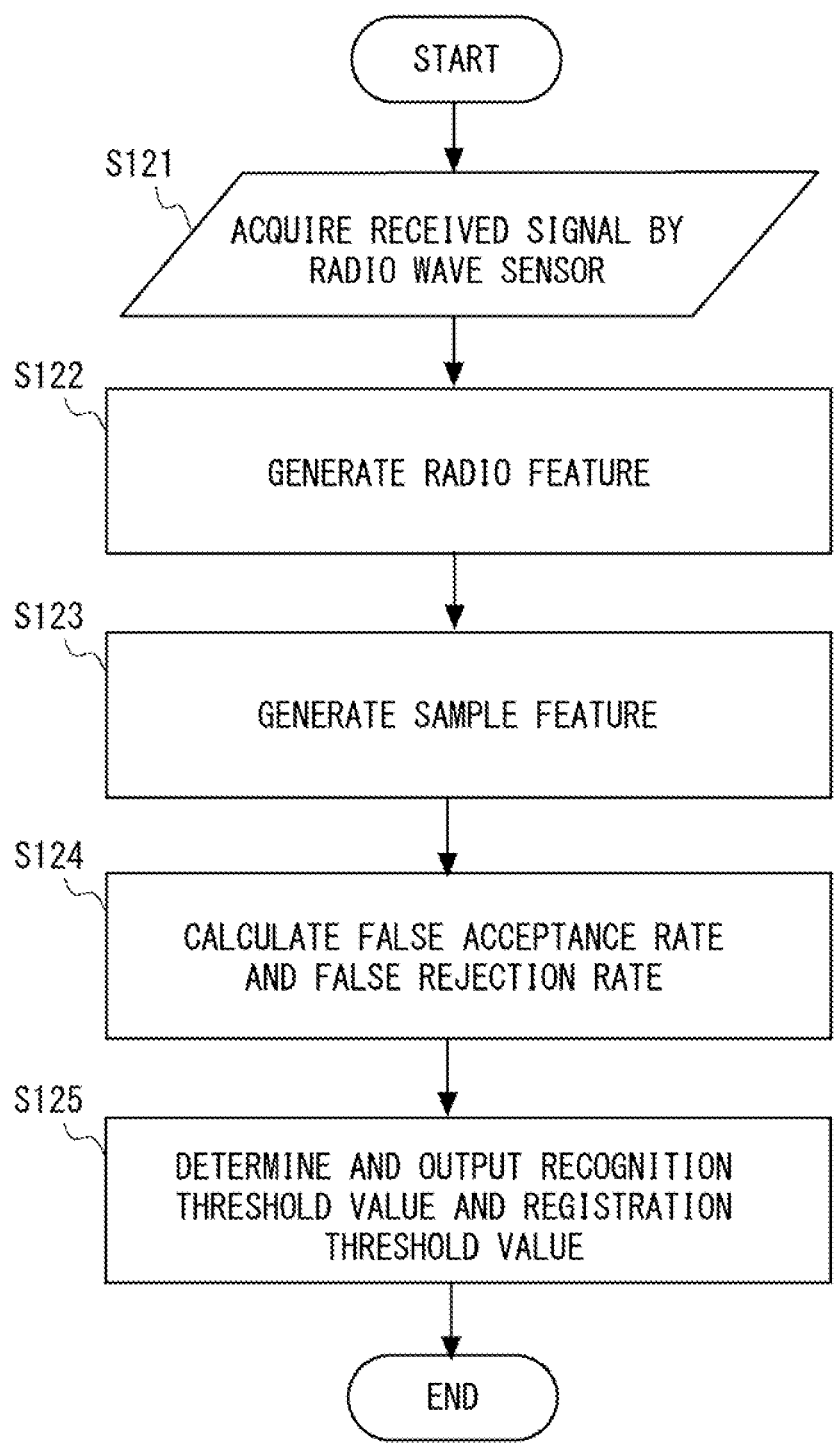
FIG. 7 is a diagram showing a processing flow related to determination of a recognition threshold value and a registration threshold value according to the second example embodiment.
Figure 8:
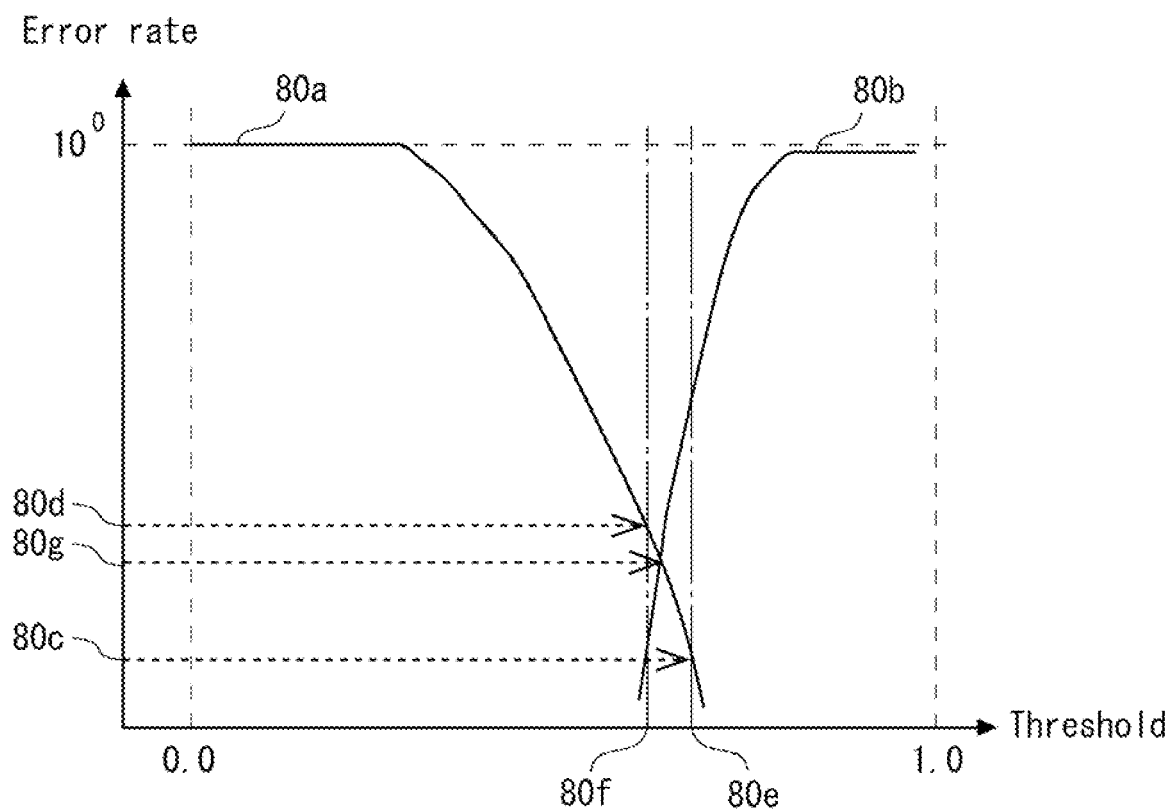
FIG. 8 is a diagram for explaining an operation of determining a recognition threshold value and a registration threshold value according to the second example embodiment.

FIG. 7 is a diagram showing an operation example of determination of a recognition threshold value and a registration threshold value (step S12 in FIG. 5) according to the second example embodiment. In an environment in which only a specific transmission terminal transmits radio waves, the transmission apparatus recognition apparatus 10 operates a receiving unit 111 having a radio wave sensor to receive a signal transmitted by the transmission terminal (step S121). Next, the radio feature generation unit 112 generates a radio feature from the received signal (step S122).

The sample feature generation unit 132 generates a sample feature from the input radio feature based on the learning parameter of the classification model learned by the learning unit 131, and associates the generated sample feature with the label (step 123). When the sample features are accumulated for a sufficient number of transmission terminals, the threshold value determination unit 133 performs the following processing. Specifically, the threshold value determination unit 133 calculates the curves of the false acceptance rate and the false rejection rate based on the degree of similarity calculation result between the sample feature generated from the labeled data set and the template feature already registered in the template feature storage unit 135 (step S124). These curves will be described later. Then, the threshold value determination unit 133 determines the recognition threshold value based on the predetermined false acceptance rate and the target error rate for recognition, and determines the registration threshold value based on the predetermined false rejection rate and the target error rate for registration (step S125).

Hereinafter, an example of a method for determining the recognition threshold value and the registration threshold value will be described with reference to FIG. 8. FIG. 8 is a diagram for explaining the operation of determining the recognition threshold value and the registration threshold value according to the second example embodiment. FIG. 8 shows an example of a curve showing changes in the false acceptance rate (80*a*) and the false rejection rate (80*b*) when the recognition threshold value is changed.

If the recognition conditions are strict, that is, if the recognition threshold value of the degree-of-similarity score is increased, the recognition result of the own terminal (the transmission terminal registered in the database) is returned, which means the recognition is successful, only when the degree of similarity is high. At this time, the false acceptance rate (FAR), which is the error rate of erroneously accepting another terminal as its own terminal, decreases as illustrated by the false acceptance rate (80a). On the other hand, the false rejection rate (FRR), which is the error rate of erroneously rejecting the own terminal due to recognizing the own terminal not to be the own terminal, increases as illustrated by the false rejection rate (80b). In this way, there is a trade-off between FAR and FRR for change of the recognition threshold value. There is the same trade-off for registration threshold value. As is clear from FIG. 8, here is an example in which the recognition threshold value and the registration threshold value determined by the threshold value determination unit 133 are values of greater than or equal to 0 and less than or equal to 1.

The transmission apparatus recognition apparatus 10 can be configured such that the registration target error rate (80c) and the recognition target error rate (80d) can be set by an operator or the like. The recognition target error rate (80d) is a predetermined target error rate related to recognition (first predetermined target error rate), and the registration target error rate (80c) is a predetermined target error rate related to registration (second predetermined target error rate). The value, which is obtained when the intersection point of the set recognition target error rate (80c) and the false acceptance rate curve (80a) is lowered to the axis of the threshold value (Threshold), is the recognition threshold value (80e). The value, which is obtained when the intersection point of registration target error rate (80d) and the false acceptance rate curve (80a) is lowered to the axis of the Threshold, is the registration threshold value (80f).

Such a relationship says that the threshold value determination unit 133 can determine the recognition threshold value based on the recognition target error rate, and can also determine the registration threshold value based on the registration target error rate. Note that a portion for determining the registration threshold value may be provided on the template feature registration unit 140 side.

In particular, the threshold value determination unit 133 can determine the recognition threshold value based on the intersection point of either the false acceptance rate curve or the false rejection rate curve with the above first predetermined target error rate. As described above, the false acceptance rate indicates the rate at which the recognition unit 130 erroneously determines that the recognition is successful, which changes according to the recognition threshold value. The false rejection rate indicates the rate at which the recognition unit 130 erroneously determines that the recognition is failed, which changes according to the recognition threshold value. The threshold value determination unit 133 can also determine the registration threshold value based on the intersection point of either the false acceptance rate curve or the false rejection rate curve with the above second predetermined error rate.

In general, conditions are often set appropriately according to the amount of damage caused by erroneously accepting another person where the recognition system applies. For example, for purposes such as entrance/exit management to restricted areas other than those concerned, the conditions may be stricter, specifically, the target error rate may be set lower. On the other hand, for purposes such as understanding the lines of flow of customers in commercial facilities, the conditions may be laxer, specifically, the target error rate may be set higher.

Here, the reason for setting the two target error rates will be explained. The recognition unit 130 calculates the degree of similarity between the template feature that is improved through methods such as averaging process and outlier deletion and the sample feature. So, it is intended to set stricter conditions to reduce the false acceptance rate at a time of the actual operation. On the other hand, the template feature registration unit 140 calculates the degree of similarity between the sample features when the averaging process and the outlier deletion are not executed. So, it is intended to set laxer conditions so that the sample features of the same transmission terminal can be easily grouped together. In FIG. 8, the recognition target error rate and the registration target error rate are illustrated with different values, but they may be the same value. When the same value is used, the equal error rate (ERR) 80g, which is the intersection point of the false acceptance rate curve (80a) and the false rejection rate curve (80b), may be used as the target error rate. FIG. 8 illustrates how the threshold value is determined from the intersection point of the two types of target error rates and the false acceptance rate (80a), but as described above, the threshold value may be determined in consideration of the false rejection rate (80b).

Figure 9:
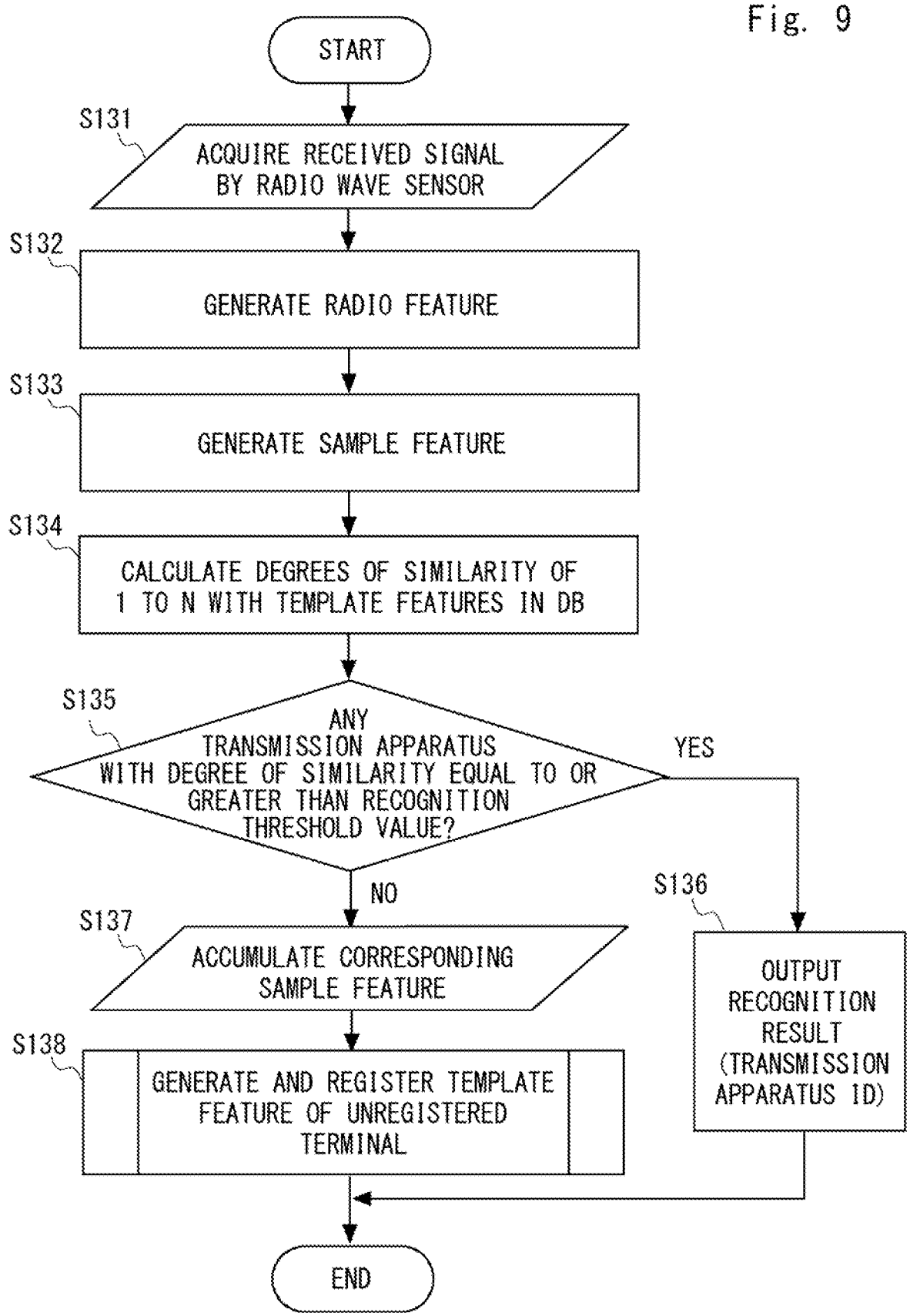
FIG. 9 is a diagram showing a processing flow related to recognition and database registration of an unknown transmission apparatus according to the second example embodiment.

FIG. 9 is a diagram showing an operation example of recognizing an unknown transmission apparatus and registering it in the database (step S13 in FIG. 5) according to the second example embodiment. In an environment in which unspecified large number of transmission terminals can transmit, the transmission apparatus recognition apparatus 10 operates the receiving unit 111 having a radio wave sensor to receive the signal transmitted by the transmission terminal (step S131). Next, the radio feature generation unit 112 generates a radio feature from the received signal (step S132). Next, the sample feature generation unit 132 generates a sample feature from the input radio feature based on the learning parameters of the classification model learned by the learning unit 131 (step S133). At this stage, since it is unknown which terminal has transmitted the radio wave received, no label is given.

The first degree-of-similarity calculation unit 134 calculates degrees of similarity of 1 to N between the sample feature generated in step S133 and the N template features stored in the template feature storage unit 135 (step S134). Then, the first degree-of-similarity calculation unit 134 determines whether there is a transmission terminal whose degree-of-similarity score is equal to or higher than the recognition threshold value among the N template features (step S135). This recognition threshold value is determined by the threshold value determination unit 133 in step S125.

When there are one or more registered transmission terminals, the first degree-of-similarity calculation unit 134 outputs a recognition result such as a transmission terminal ID and a time when the last presence was detected, from the output unit 136 (step S136). On the other hand, when there is no transmission terminal with a degree-of-similarity equal to or greater than the recognition threshold value, the first degree-of-similarity calculation unit 134 accumulates the above sample feature in the sample feature temporary holding unit 146 (step S137). Then, when a certain number of sample features are accumulated, the template feature registration unit 140 generates the template feature and registers the generated template feature in the template feature storage unit 135 (step S138).

Figure 10:
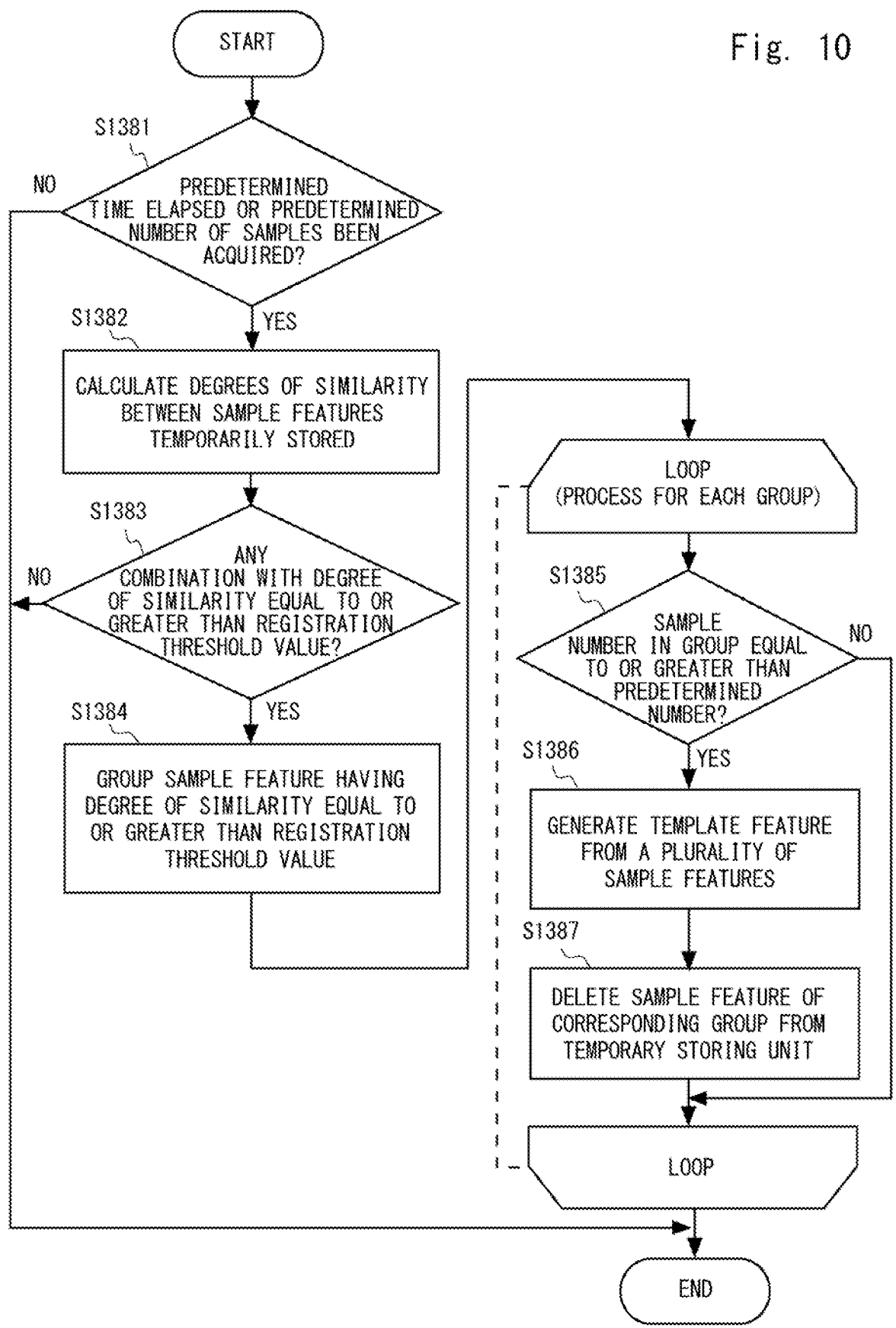
FIG. 10 is a diagram showing a processing flow related to generation and registration of a template feature of an unregistered transmission apparatus according to the second example embodiment.

This step S138 will be described in detail with reference to FIG. 10. FIG. 10 is a diagram showing a processing flow related to the generation and registration processing of the template feature.

In the template feature registration unit 140, the template feature generation unit 148 checks whether a predetermined time has elapsed or a predetermined number of sample features have been accumulated, that is, whether a predetermined period of time has elapsed (step S1381). In a wireless environment in which wireless communication tends to be burst-transferred, it is desirable that the predetermined period of time (the predetermined time or the predetermined number of sample features) be determined in consideration of the tendency.

When step S1381 is YES, the second degree-of-similarity calculation unit 147 calculates the degree of similarity of M to M−1 between the sample features temporarily stored in the sample feature temporary holding unit 146 (step S1382). In the degree of similarity calculation in step S1382, the cosine similarity, the Euclidean score, and the like can be used in the same manner as described above.

The second degree-of-similarity calculation unit 147 checks whether there is a combination of sample features whose degree of similarity, calculated in step S1382, has a degree-of-similarity score that is equal to or higher than the registration threshold value determined by the threshold value determination unit 133 in step S125 (step S1383). When step 1383 is YES, the second degree-of-similarity calculation unit 147 groups sample features having a degree-of-similarity score equal to or higher than the registration threshold value (step S1384). Then, the template feature generation unit 148 carries out the processing of the next steps S1385 to S1387 for each group. In step S1385, it is checked whether the number of sample features in a certain group is a predetermined number or more. In step S1386, when step S1385 is YES, template features are generated from a plurality of sample features in the group. In step S1387, the sample feature of the group is deleted from the sample feature temporary holding unit 146 (step S1387).

Here, a supplementary explanation will be given regarding the generation of the template feature in step S1386. It is desirable that the template feature of a certain terminal be typical in a large number of sample features. In general, even sample features generated from signals transmitted by the same terminal vary in shape due to the effects of noise, fading, and the like. A template feature generated from sample features that vary to some extent can be a robust feature.

Generation of a template feature from sample features that vary may use outlier determination and standardization process and subsequently averaging process. An example of outlier determination process may be a process of: generating the distribution of the elements of the feature vectors; and deleting feature vectors with elements smaller than the first quartile point −1.5*width W and elements greater than the third quartile point+1.5*width W, from the above group with the high degree-of-similarity score. Here, the width W is defined as the third quartile point—the first quartile point. This process is an outlier determination process using what is called a box plot. An example of the standardization process may be a process of normalizing respective elements in the feature vectors so that the maximum value becomes 1 and the minimum value becomes 0. Finally, an averaging process such as arithmetic mean, multiply mean (geometric mean), or harmonic mean is performed for each element.

In this way, the template feature generation unit 148 can generate a distribution of the elements of the feature vectors, and perform any one of the following: a process of executing outlier determinations from a quartile to delete outliers; a process of standardizing respective elements of feature vectors; and both the processes. After performing such processes, the template feature generation unit 148 obtains an average vector as a typical vector by averaging process such as arithmetic mean, geometric mean, or arithmetic mean. The template feature generation unit 148 registers this typical vector as a template feature in the template feature storage unit 135.

The template feature generation unit 148 executes such processes for each group grouped by the second degree-of-similarity calculation unit 147. In other words, the template feature generation unit 148 generates a template feature as a typical vector from a plurality of sample features included in the group for each group, and registers the template feature in the template feature storage unit 135.

The above configuration allows the transmission apparatus recognition apparatus 10, in an environment in which an unspecified large number of transmission terminal unregistered in the database can transmit, to exhibit effects of preventing increase in man-hours of the operator, preventing increase in the calculation amount at a time of recognition, and improving the robustness.

Third Example Embodiment

Figure 11:
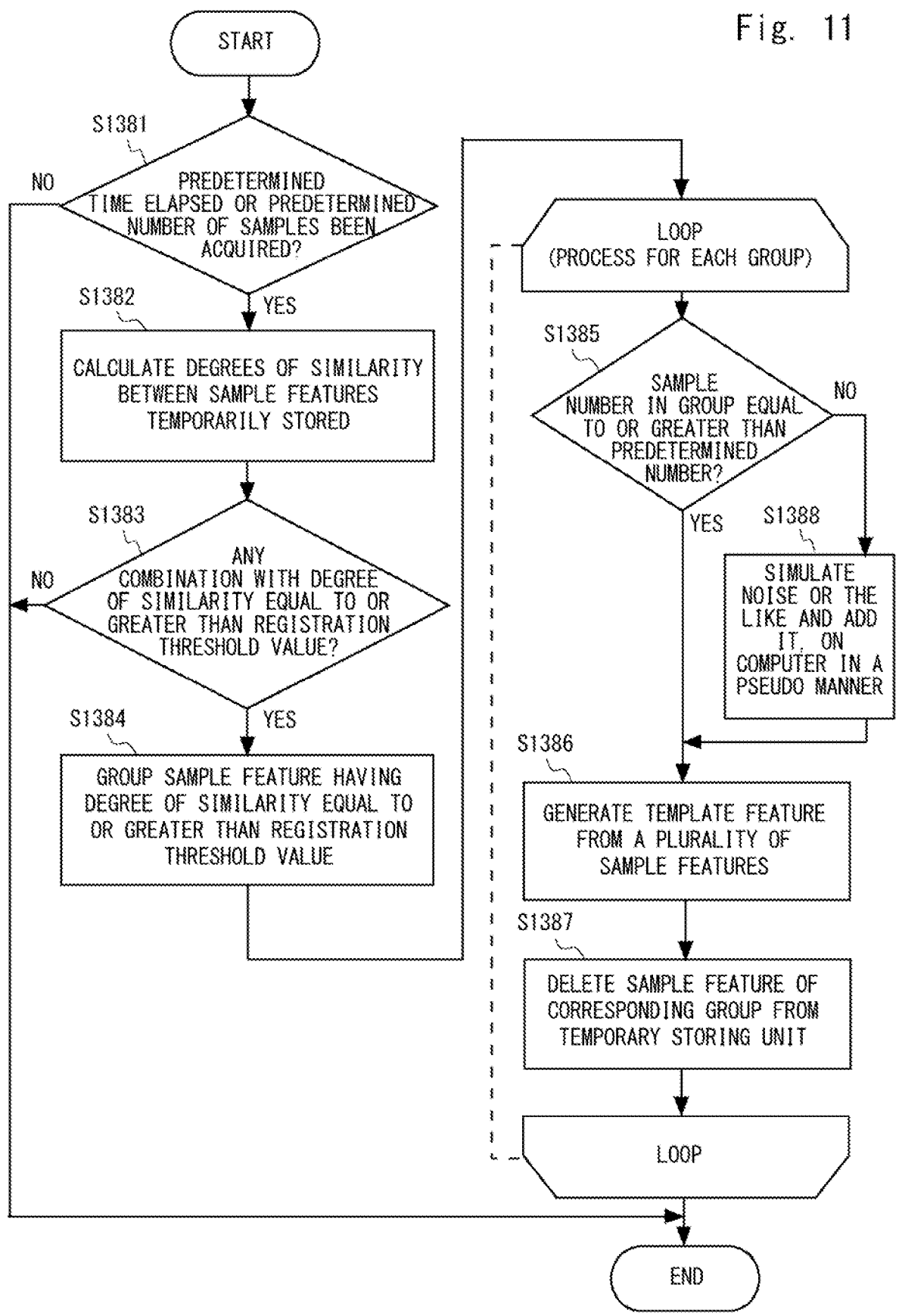
FIG. 11 is a diagram showing a processing flow related to generation and registration of a template feature of an unregistered transmission apparatus according to a third example embodiment.

A third example embodiment will be described focusing on the differences from the second embodiment with reference to FIG. 11 as well. However, also in the third example embodiment, various examples described in the first and second example embodiments can be applied.

The configuration of the transmission apparatus recognition apparatus according to this example embodiment can be the same as the configuration of the transmission apparatus recognition apparatus 10 according to the second example embodiment illustrated in FIG. 3. Therefore, the description of the configuration will be omitted, and the following description will be made using the reference numerals in FIG. 3.

As described in the second example embodiment, the template features of a certain terminal are desirably typical one of a large number of the sample features. A template feature generated from sample features that vary to some extent can be a robust feature. Therefore, in the second example embodiment, there is executed a process (step S1385) for checking whether the number of samples in the group is equal to or greater than a predetermined number.

On the other hand, some purpose of the transmission apparatus recognition apparatus may desire recognizing a terminal that transmits radio waves very rarely. If the radio waves transmitted by one terminal are few, the sample features may not be sufficiently accumulated. At this time, the terminal having the sample feature corresponding to such a group in step S1385 may not have a template feature automatically generated until a long time passes.

Therefore, this example embodiment has a template feature generation process added for a group having sample features less than a predetermined number in step S1385. The generation process according to this example embodiment will be described with reference to FIG. 11. The difference between FIG. 11 and FIG. 10 of the second example embodiment is that this example embodiment has a process (step S1388) added to the template feature generation process. The process (step S1388) includes: simulating effects of a plurality of different noises and communication paths on a computer in a pseudo manner; and generating sample features when they are added. Specifically, the process according to this example embodiment is such that, when step S1385 is NO in the process in the second embodiment, the above step S1388 is executed without ending the processing of the group, and then steps S1386 and S1387 are executed.

As described above, when the number of sample features included in the group is small, the template feature generation unit 148 can add sample features included in the group for each group grouped by the second degree-of-similarity calculation unit 147. The threshold value for this number corresponds to the above predetermined number in step S1385, and can be determined by an operator, for example. Thus adding sample features based on the simulated results can increase the number of sample features in the group. In this way, the sample features can be added by means of simulating the effects of at least one of a plurality of different noises and a plurality of different communication paths on a computer in a pseudo manner.

With such a configuration, the transmission apparatus recognition apparatus 10 according to this example embodiment can generate robust template features also for a terminal that rarely transmit radio waves at a stage in which sufficient sample features are not accumulated.

Note that, in the example embodiments of the present disclosure including this example embodiment, the above description is on the assumption that the template feature to be generated is one for each transmission apparatus. However, it is desirable to register not only one template feature close to the stable state, which is less affected by noise and fading, but also template features far from the stable state additionally, in the template feature storage unit 135. Examples of the template features far from the stable state include a template feature, generated from a plurality of sample features buried in a noise, having a high degree-of-similarity scores with respect to a situation with the noise. Examples of the template feature far from the stable state further include a template feature, generated from a plurality of sample features affected by a deep fading, having a high degree-of-similarity scores with respect to a situation with the fading. Using such a method, the first degree-of-similarity calculation unit 134 can secondarily output the noise situation and the fading situation between the transmission terminal and the transmission apparatus recognition apparatus 10, from the output unit 136, in addition to the terminal-specific ID.

Specifically, as the template features (the template features to be recognized) in the database, the template feature storage unit 135 can store (hold) two or more template features for each of several different communication path environments, for each transmission terminal. In this case, the first degree-of-similarity calculation unit 134 outputs a recognition result from the output unit 136. The recognition result includes the identification information (ID) specific to the transmission terminal and the situation of the communication path environment between the transmission terminal and the transmission apparatus recognition apparatus 10. As described above, in this example embodiment, the output unit 136 can secondarily output the situation of the communication path environment.

Fourth Example Embodiment

A fourth example embodiment will be described focusing on the differences from the second embodiment. However, also in the fourth example embodiment, various examples described in the first to third example embodiments can be applied.

The configuration of the transmission apparatus recognition apparatus according to this example embodiment can be the same as the configuration of the transmission apparatus recognition apparatus 10 according to the second example embodiment illustrated in FIG. 3. Therefore, the description of the configuration will be omitted, and the following description will be made using the reference numerals in FIG. 3.

In this example embodiment, it is assumed that the transmission source transmits a plurality of symbols in a burst in a short time. This is because such an assumption may be realistically possible. At this time, it is preferable to multiply a weighting factor in the calculation process of the degrees of similarity (calculation of degree of similarity in expressions (1) and (2)) between the temporarily stored sample features carried out in step 1382 of FIG. 10. The weighting factors include a weighting factor such that: sample features, whose reception times are close to each other, have a higher degree-of-similarity score; or sample features, whose reception times are distant from each other, have a lower degree-of-similarity score. Thus calculating the degree of similarity by multiplying such a weighting factor can reduce the possibility that signals transmitted by different transmission terminals are erroneously estimated to be the same terminal and grouped in the same group.

This example embodiment can exhibit an effect that more accurate template feature can be generated in addition to the effect of the second embodiment.

Fifth Example Embodiment

Figure 12:
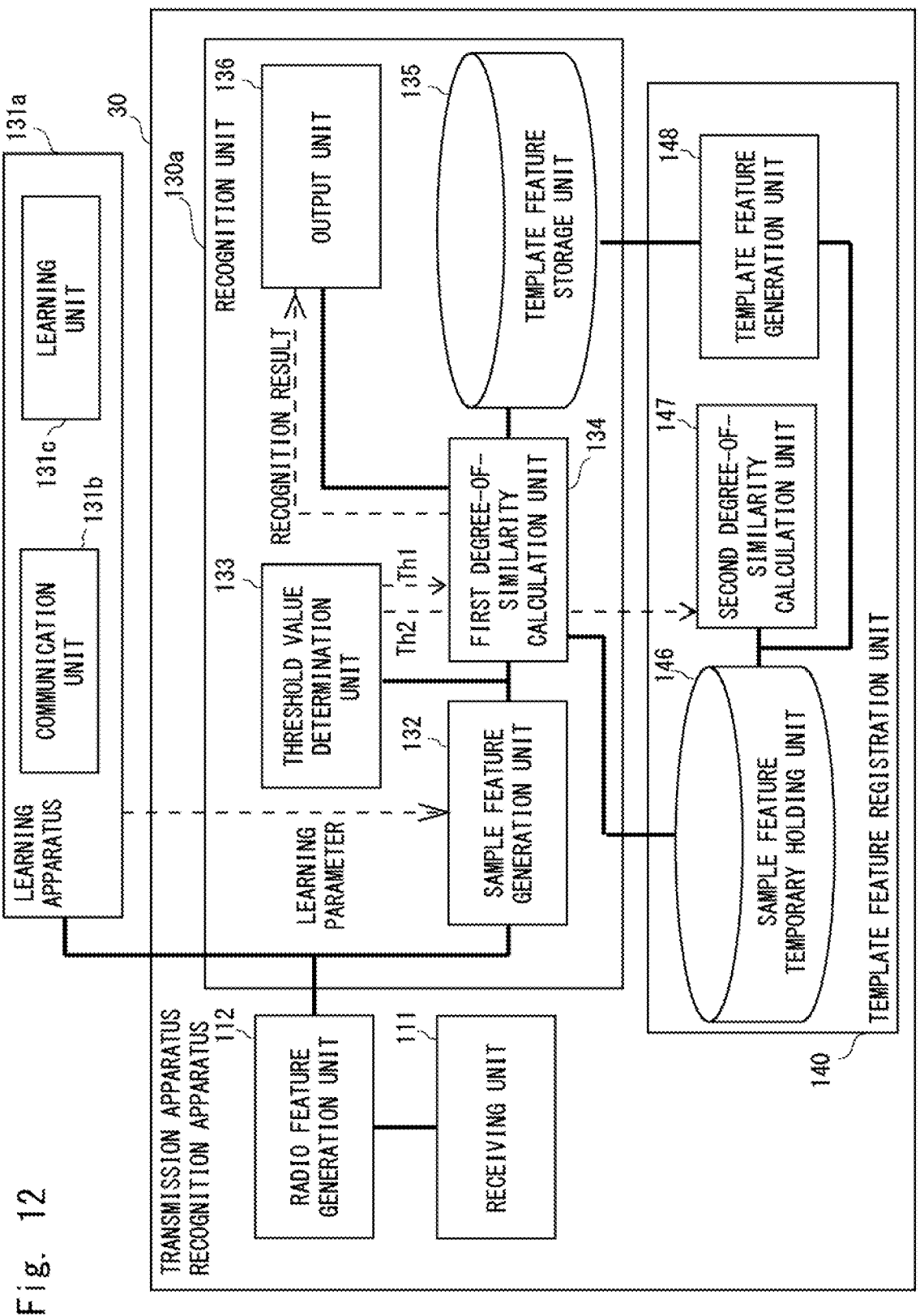
FIG. 12 is a block diagram showing an example of a functional configuration of a transmission apparatus recognition system according to a fifth example embodiment.

A fifth example embodiment will be described with reference to FIG. 12, focusing on the differences from the second example embodiment. However, also in the fifth example embodiment, various examples described in the first to fourth example embodiments can be applied. FIG. 12 is a block diagram showing an example of a functional configuration of a transmission apparatus recognition system according to the fifth example embodiment. In FIG. 12, the same numbers are given to the same components as those in the second example embodiment illustrated in FIG. 3, and the description thereof will be omitted.

In general, when the learning time is compared with the inference time in a machine learning, the required computing performance is often sufficiently higher in the learning time. In particular, when deep learning is used for model generation (learning parameter generation), a high-performance graphics processing unit (GPU) may be used in the learning time. Although the GPU has high performance, it is expensive and has high power consumption. Therefore, there is a problem in which GPU is not suitable for an application in which a large number of transmission apparatus recognition apparatuses are widely arranged as edge devices.

Therefore, the transmission apparatus recognition apparatus according to this example embodiment generates learning parameters by external learning. Then, the transmission apparatus recognition apparatus generates sample features by utilizing an inexpensive and low power consumption hardware accelerator dedicated to inference, or the like.

Therefore, as shown in FIG. 12, the transmission apparatus recognition system according to this example embodiment includes a transmission apparatus recognition apparatus 30 and a learning apparatus 131a. The transmission apparatus recognition apparatus 30 is an apparatus obtained by removing the learning unit 131 from the transmission apparatus recognition apparatus 10 of FIG. 3 to arrange the learning unit 131 outside. The learning apparatus 131a corresponds to the learning unit 131 of FIG. 3. The transmission apparatus recognition apparatus 30 includes a receiving unit 111, a radio feature generation unit 112, a template feature registration unit 140, and a recognition unit 130a that is obtained by removing the learning unit 131 from the recognition unit 130 in FIG. 3.

Specifically, the recognition unit 130a includes a sample feature generation unit 132, a threshold value determination unit 133, a first degree-of-similarity calculation unit 134, a template feature storage unit 135, and an output unit 136. Then, the recognition unit 130a calculates, based on the radio feature generated by the radio feature generation unit 112, the degree of similarity between the sample feature generated from the received signal and the template feature in the internal database (the template feature storage unit 135), and outputs the recognition result.

The learning apparatus 131a includes a receiving unit that receives radio features from the transmission apparatus recognition apparatus 30, and a learning unit 131c that generates a learned model for extracting sample features from the received radio features. The learning apparatus 131a further includes a transmission unit that transmits learning parameters representing the learned model generated by the learning unit 131c to the transmission apparatus recognition apparatus 30. The receiving unit and the transmission unit in the learning apparatus 131a are illustrated by the communication unit 131b. The communication unit 131b can be a wired communication unit or a wireless communication unit.

When the receiving unit 111 receives a signal, the sample feature generation unit 132 generates the sample feature from the radio feature using the learning parameters. The sample feature generation unit 132 sets the learning parameters received from the learning apparatus 131a to, for example, an unlearned model (an unlearned classification model or an old parameter classification model), and thereby can generate a sample feature from the radio feature.

Since the operation flow in the transmission apparatus recognition system according to this example embodiment is basically the same as that of the second embodiment, the description thereof will be omitted.

With the above configuration, the transmission apparatus recognition system according to this example embodiment exhibits the following effects in addition to the effects of the second example embodiment. In other words, the transmission apparatus recognition system according to this example embodiment achieves terminal recognition and template feature database registration at low cost and low power consumption, in an application in which a large number of transmission apparatus recognition apparatuses are widely arranged as edge devices.

Other Example Embodiment

In the plurality of flowcharts referred to in the description of the second to fifth example embodiments, a plurality of steps (processes) are described in order, but the execution order of the steps executed in each example embodiment is not limited to the order of description. In each example embodiment, the order of the illustrated steps can be changed within a range that does not hinder anything in the processes. For example, each process can be executed in parallel. In addition, the above-described example embodiments can be combined as long as there is no conflict with each other.

Then, as in the description in the first to fifth example embodiments on the procedure of processing in the transmission apparatus recognition apparatus, the present disclosure may also take a form as a transmission apparatus recognition method in a transmission apparatus recognition apparatus including a receiving unit that receives a signal wirelessly transmitted from a transmission terminal. This transmission apparatus recognition method can include the following recognition step and registration step. The above recognition step calculates the degree of similarity between the sample feature generated from the received signal received by the receiving unit and the template feature registered in advance, compares the degree of similarity with the recognition threshold value, and thereby recognizes the transmission terminal. The registration step generates a template feature from the sample feature that failed to be recognized in the recognition step. Note that other examples are as described in the various example embodiments described above.

In addition, regarding the transmission apparatus recognition apparatus and its system according to the first to fifth example embodiments, the individual units that are the components thereof have been functionally described, but the present disclosure is not limited to this. It is sufficient that the transmission apparatus recognition apparatus as a whole includes the function of each unit. For example, a radio feature generation unit may be included in the recognition unit. Additionally, in each of the above-described example embodiments, the description has been made on the assumption that the transmission apparatus recognition apparatus is configured as a single apparatus, but it can be configured as a plurality of apparatuses by dividing the functions.

Figure 13:
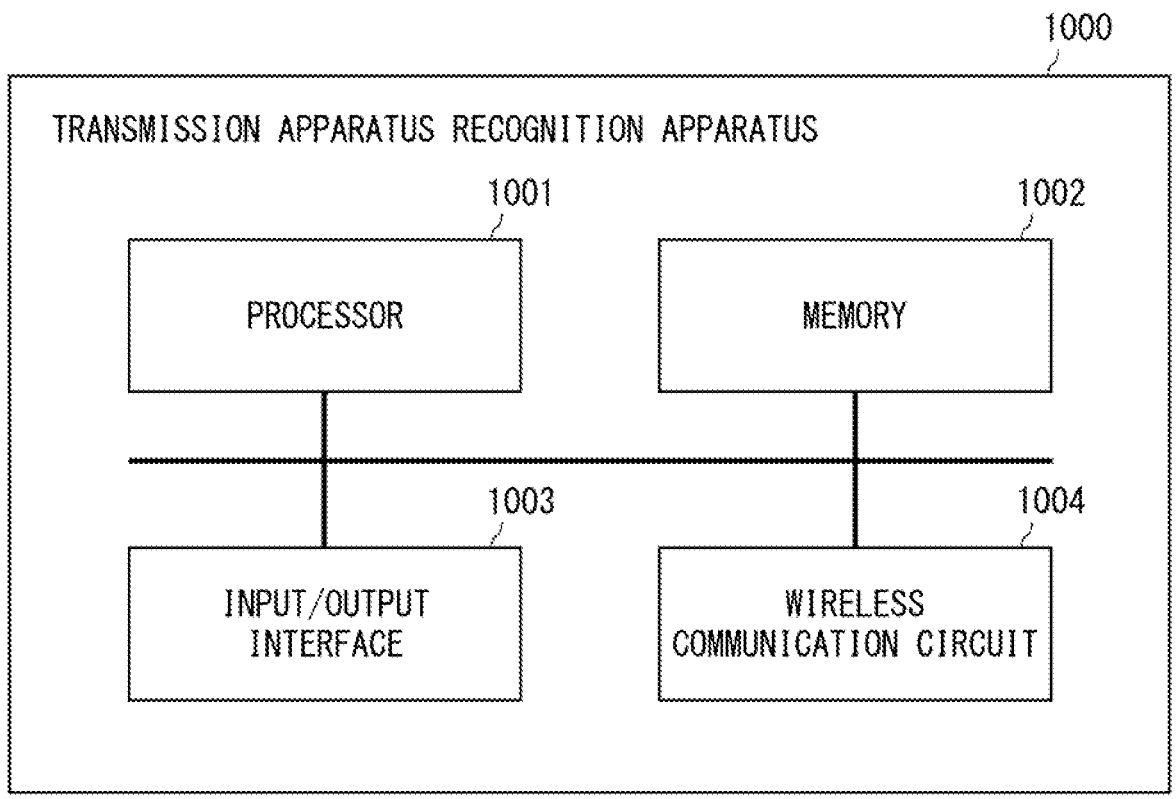
FIG. 13 is a diagram showing an example of a hardware configuration included in an apparatus.

In addition, the transmission apparatus recognition apparatus and learning apparatus according to the first to fifth example embodiments can each have the following hardware configuration. FIG. 13 is a diagram showing an example of a hardware configuration included in the apparatus.

The apparatus 1000 illustrated in FIG. 13 can be a transmission apparatus recognition apparatus according to the first to fifth example embodiments. The apparatus 1000 that functions as a transmission apparatus recognition apparatus can be configured by an information processing apparatus (what is called a computer), and includes, for example, a processor 1001, a memory 1002, an input/output interface 1003, and a wireless communication circuit 1004. Note that transmission apparatus recognition apparatus 1000 may include a wired communication circuit in addition to the wireless communication circuit 1004. The components such as the processor 1001 are connected by an internal bus or the like so that they can communicate with each other.

The processor 1001 is a programmable apparatus such as a CPU (Central Processing Unit), an MPU (Micro Processing Unit), a DSP (Digital Signal Processor), or a GPU. Alternatively, the processor 1001 may be an apparatus such as an FPGA (Field Programmable Gate Array) or an ASIC (Application Specific Integrated Circuit). The processor 1001 can execute various programs including an operating system (OS).

The memory 1002 is a storage apparatus such as a RAM (Random Access Memory), a ROM (Read Only Memory), an HDD (Hard Disk Drive), an SSD (Solid State Drive), or a memory card. The memory 1002 stores an OS program, an application program, and various data.

The input/output interface 1003 is an interface of a display apparatus or an input apparatus (not shown). The display apparatus is, for example, a liquid crystal display. The input apparatus is, for example, an apparatus that accepts user operations such as a keyboard and a mouse.

The wireless communication circuit 1004 is a circuit, a module, or the like that performs wireless communication with other apparatuses. For example, the wireless communication circuit 1004 includes an RF (Radio Frequency) circuit. Note that a part or all of the apparatus 1000 can also be realized by one or more integrated circuits.

The function of the apparatus 1000 as a transmission apparatus recognition apparatus can be realized by various processing modules. The processing module is realized, for example, by the processor 1001 executing a program stored in the memory 1002. The program (transmission apparatus recognition program) in this case can be a program for causing a computer including a receiving unit (illustrated in the wireless communication circuit 1004) that receives the signal wirelessly transmitted from the transmission terminal, to execute the above-described recognition step and registration step. Note that other examples are as described in the various example embodiments described above. Furthermore, the processing module may be realized by a semiconductor chip.

Furthermore, the apparatus 1000 illustrated in FIG. 13 can be a learning apparatus according to the fifth example embodiment. The apparatus 1000 that functions as a learning apparatus can be configured by an information processing apparatus (called a computer), and includes, for example, a processor 1001, a memory 1002, an input/output interface 1003, a wireless communication circuit 1004, and the like. The apparatus 1000 may include a wired communication circuit instead of the wireless communication circuit 1004.

The function of the apparatus 1000 as a learning apparatus can also be realized by various processing modules. The processing module is realized, for example, by the processor 1001 executing a program stored in the memory 1002. The program (learning program) in this case can be a program for causing the processor 1001 to execute the next receiving step, learning step, and transmitting step. This receiving step receives radio features from the transmission apparatus recognition apparatus. This learning step generates a learned model for extracting a sample feature from the received radio feature. This transmitting step transmits the learning parameters representing the learned model generated in the learning step to the transmission apparatus recognition apparatus. Note that other examples are as described in the various example embodiments described above.

In addition, the transmission apparatus recognition program and the learning program described above can be contained in a computer readable storage medium. This storage medium can be non-transitory, that is, a non-transitory computer readable medium. As described above, the object of the present disclosure can also be realized by embodying it as a computer program product. For example, the program can be downloaded via the network or updated using a storage medium that stores the program. Furthermore, the processing module described above may be realized by a semiconductor chip.

In this way, each program can be stored and supplied to the computer using various types of non-transitory computer readable medium. Non-transitory computer readable medium includes various types of tangible storage medium. Examples of non-transitory computer readable medium includes magnetic recording medium (such as flexible disk, magnetic tapes, hard disk drive), and magneto-optical recording medium (such as magneto-optical disk). The examples further include CD-ROM (Read Only Memory), CD-R, and a CD-R/W. The examples further include semiconductor memory (such as mask ROM, PROM (Programmable ROM), EPROM (Erasable PROM), flash ROM, RAM (Random Access Memory)). The program may also be supplied to the computer by various types of transitory computer readable medium. Examples of transitory computer readable medium include electric signals, optical signals, and electromagnetic waves. The transitory computer readable medium can supply the program to the computer via a wired communication path such as an electric wire and an optical fiber, or a wireless communication path.

A part or all of the above example embodiments may be described as in the following supplementary notes, but is not limited to the following.

Supplementary Note
Supplementary Note 1

A transmission apparatus recognition apparatus, including:
  a receiving unit configured to receive a signal wirelessly transmitted from a transmission apparatus;
  a recognition unit configured to recognize the transmission apparatus by calculating a degree of similarity between a sample feature generated from the received signal received by the receiving unit and a template feature registered in advance and by comparing the degree of similarity with a recognition threshold value; and
  a template feature registration unit configured to generate a template feature from a sample feature that has failed to be recognized by the recognition unit.

Supplementary Note 2

The transmission apparatus recognition apparatus according to Supplementary Note 1,
  further including a radio feature generation unit configured to generate a radio feature from a signal received by the receiving unit,
  wherein the recognition unit includes a sample feature generation unit configured to generate the sample feature by extracting the sample feature, as a feature having a lower dimension than the radio feature, from the radio feature.

Supplementary Note 3

The transmission apparatus recognition apparatus according to Supplementary Note 2, wherein
  the recognition unit includes a learning unit configured to generate a learned model for extracting the sample feature from the radio feature, and
  the sample feature generation unit generates the sample feature from the radio feature using the learned model when the receiving unit receives a signal, Supplementary Note 4

The transmission apparatus recognition apparatus according to Supplementary Note 2 or 3, wherein
  the recognition unit includes a recognition threshold value determination unit configured to determine the recognition threshold value based on a first predetermined target error rate.

Supplementary Note 5

The transmission apparatus recognition apparatus according to Supplementary Note 4, wherein:
  the recognition threshold value determination unit determines the recognition threshold value based on an intersection point of either a false acceptance rate curve or a false rejection rate curve with the first predetermined target error rate;
  the false acceptance rate indicates a rate at which the recognition unit erroneously determines that a recognition is successful, which changes according to the recognition threshold value; and the false rejection rate indicates a rate at which the recognition unit erroneously determines that a recognition is failed, which changes according to the recognition threshold value.

Supplementary Note 6

The transmission apparatus recognition apparatus according to any one of Supplementary Notes 2 to 5, wherein
the recognition unit includes a first degree-of-similarity calculation unit that: calculates degrees of similarity of 1 to N between the sample feature and the template features registered in advance (where N is a positive integer); compares each of the calculated N degrees of similarity with the recognition threshold value; and thereby recognize the transmission apparatus.

Supplementary Note 7

The transmission apparatus recognition apparatus according to Supplementary Note 6, wherein:
the recognition unit includes a template feature storage unit that stores template features, as the template feature registered in advance, for two or more different communication path environments for each transmission apparatus; and
the first degree-of-similarity calculation unit outputs a result, as a recognition result, including identification information specific to the transmission apparatus and a situation of the communication path environment between the transmission apparatus and the transmission apparatus recognition apparatus.

Supplementary Note 8

The transmission apparatus recognition apparatus according to any one of Supplementary Notes 1 to 7, wherein
the degree of similarity calculated by the recognition unit is any one or a combination of cosine similarity, Euclidean score, and correlation coefficient.

Supplementary Note 9

The transmission apparatus recognition apparatus according to any one of Supplementary Notes 1 to 8, wherein
the template feature registration unit includes:
a temporary holding unit configured to temporarily hold the sample feature that has failed to be recognized by the recognition unit, and
a template feature generation unit configured to generate a template feature from a sample feature held by the temporary holding unit.

Supplementary Note 10

The transmission apparatus recognition apparatus according to Supplementary Note 9, wherein:
the template feature registration unit includes a second degree-of-similarity calculation unit that calculates a degree of similarity between sample features held in the temporary holding unit every predetermined period of time, and groups those whose degree of similarity is equal to or greater than a registration threshold value; and
the template feature generation unit generates a template feature from a plurality of sample features included in a group for each group grouped by the second degree-of-similarity calculation unit.

Supplementary Note 11

The transmission apparatus recognition apparatus according to Supplementary Note 10, wherein
the template feature registration unit includes a registration threshold value determination unit configured to determine the registration threshold value based on a second predetermined target error rate.

Supplementary Note 12

The transmission apparatus recognition apparatus according to Supplementary Note 11, wherein:
the registration threshold value determination unit determines the registration threshold value based on the intersection point of either a false acceptance rate curve or a false rejection rate curve with the second predetermined target error rate;
the false acceptance rate indicates a rate at which the recognition unit erroneously determines that a recognition is successful, which changes according to the recognition threshold value; and
the false rejection rate indicates a rate at which the recognition unit erroneously determines that a recognition is failed, which changes according to the recognition threshold value.

Supplementary Note 13

The transmission apparatus recognition apparatus according to any one of Supplementary Notes 10 to 12, wherein
the degree of similarity calculated by the second degree-of-similarity calculation unit is any one or a combination of cosine similarity, Euclidean score, and a correlation coefficient.

Supplementary Note 14

The transmission apparatus recognition apparatus according to any one of Supplementary Notes 10 to 13, wherein
the template feature generation unit:
generates a distribution of elements of feature vectors;
perform any one of the following: a process of executing outlier determinations from a quartile to delete outliers; a process of standardizing respective elements of feature vectors; and both the processes;
then obtains an average vector by averaging process; and
thereby generates a template feature, as a typical vector, from a plurality of sample features included in a group for each group grouped by the second degree-of-similarity calculation unit.

Supplementary Note 15

The transmission apparatus recognition apparatus according to any one of Supplementary Notes 10 to 14, wherein
when the number of sample features included in the group is small for each group grouped by the second degree-of-similarity calculation unit, the template feature generation unit simulates effects of at least one of a plurality of different noises and a plurality of communication paths in a pseudo manner to add sample features included in the group.

Supplementary Note 16

The transmission apparatus recognition apparatus according to any one of Supplementary Notes 10 to 15, wherein
the second degree-of-similarity calculation unit multiplies the degree of similarity by a weighting factor such that sample features whose reception times are close to each other have a higher degree-of-similarity score, or by a weighting factor such that sample features whose reception times are distant from each other have a smaller degree-of-similarity score, and groups those whose degree of similarity after the multiplication are equal to or greater than the registration threshold value.

Supplementary Note 17

A transmission apparatus recognition system, including:
a transmission apparatus recognition apparatus according to Supplementary Note 2; and
a learning apparatus, wherein
the learning apparatus includes:
a learning apparatus side receiving unit configured to receive the radio feature from the transmission apparatus recognition apparatus;
a learning unit configured to generate a learned model for extracting the sample feature from the radio feature; and
a learning apparatus side transmission unit configured to transmit a learning parameter to the transmission apparatus recognition apparatus, the learning parameter expressing the learned model generated by the learning unit, and
the sample feature generation unit generates the sample feature from the radio feature using the learning parameter when the receiving unit receives a signal.

Supplementary Note 18

A transmission apparatus recognition method in a transmission apparatus recognition apparatus including a receiving unit configured to receive a signal wirelessly transmitted from a transmission apparatus, the method including:
a recognition step for recognizing the transmission apparatus by calculating a degree of similarity between a sample feature generated from a received signal received by the receiving unit and a template feature registered in advance and by comparing the degree of similarity with a recognition threshold value; and
a registration step for generating a template feature from a sample feature that failed to be recognized in the recognition step.

Supplementary Note 19

A non-transitory computer readable medium storing a program
for causing a computer, including a receiving unit configured to receive a signal wirelessly transmitted from a transmission apparatus, to execute:
a recognition step for recognizing the transmission apparatus by calculating a degree of similarity between a sample feature generated from a received signal received by the receiving unit and a template feature registered in advance and by comparing the degree of similarity with a recognition threshold value; and
a registration step for generating a template feature from a sample feature that failed to be recognized in the recognition step.

Note that the present disclosure is not limited to the above example embodiments, and can be appropriately changed without departing from the spirit. Furthermore, the present disclosure may be carried out by appropriately combining the individual example embodiments.

Although the invention of the present application has been described above with reference to the example embodiments, the invention of the present application is not limited to the above. In the configuration and details of the invention of the present application, various changes that can be understood by those skilled in the art can be made within the scope of the invention.

REFERENCE SIGNS LIST 1, 10, 30 TRANSMISSION APPARATUS RECOGNITION APPARATUS
1a, 101, 111 RECEIVING UNIT
1b, 130, 130a RECOGNITION UNIT
1c, 140 TEMPLATE FEATURE REGISTRATION UNIT
102, 132 SAMPLE FEATURE GENERATION UNIT
103, 133 THRESHOLD VALUE DETERMINATION UNIT
104, 134 FIRST DEGREE-OF-SIMILARITY CALCULATION UNIT
105, 135 TEMPLATE FEATURE STORAGE UNIT
106, 146 SAMPLE FEATURE TEMPORARY HOLDING UNIT
107, 147 SECOND DEGREE-OF-SIMILARITY CALCULATION UNIT
108, 148 TEMPLATE FEATURE GENERATION UNIT
112 RADIO FEATURE GENERATION UNIT
130, 130a RECOGNITION UNIT
131, 131c LEARNING UNIT
131a LEARNING APPARATUS
131b COMMUNICATION UNIT
136 OUTPUT UNIT
900a, 900b TRANSMISSION TERMINAL
1000 APPARATUS
1001 PROCESSOR
1002 MEMORY
1003 INPUT/OUTPUT INTERFACE
1004 WIRELESS COMMUNICATION CIRCUIT
A1 TARGET AREA

What is claimed is:

1. A transmission apparatus recognition apparatus, comprising:
a receiver configured to receive a signal wirelessly transmitted from a transmission apparatus;
a recognizer configured to recognize the transmission apparatus by calculating a degree of similarity between a sample feature generated from the received signal received by the receiver and a template feature registered in advance and by comparing the degree of similarity with a recognition threshold value; and
a first generator configured to generate a template feature from a sample feature that has failed to be recognized by the recognizer.

2. The transmission apparatus recognition apparatus according to claim 1, further comprising a second generator configured to generate a radio feature from a signal received by the receiver,
wherein the recognizer includes a third generator configured to generate the sample feature by extracting the sample feature, as a feature having a lower dimension than the radio feature, from the radio feature.

3. The transmission apparatus recognition apparatus according to claim 2, wherein
the recognizer includes a learner configured to generate a learned model for extracting the sample feature from the radio feature, and
the third generator generates the sample feature from the radio feature using the learned model when the receiver receives a signal.

4. The transmission apparatus recognition apparatus according to claim 2, wherein the recognizer configured to determine the recognition threshold value based on a first predetermined target error rate.

5. The transmission apparatus recognition apparatus according to claim 1, wherein
the first generator configured to:
temporarily hold a sample feature that has failed to be recognized by the recognizer; and
generate a template feature from the sample features temporarily held.

6. The transmission apparatus recognition apparatus according to claim 5, wherein
the first generator configured to:
calculate degrees of similarity between sample features temporary held every predetermined period of time and group those whose degrees of similarity are equal to or greater than a registration threshold value, and
for each group, generate a template feature from a plurality of sample features included in the group.

7. The transmission apparatus recognition apparatus according to claim 6, wherein the first generator configured to determine the registration threshold value based on a second predetermined target error rate.

8. A transmission apparatus recognition system, comprising:
a transmission apparatus recognition apparatus according to claim 2; and
a learning apparatus, wherein
the learning apparatus includes:
a learning apparatus side receiver for receiving the radio feature from the transmission apparatus recognition apparatus;
a learner configured to generate a learned model for extracting the sample feature from the radio feature; and
a learning apparatus side transmitter configured to transmit a learning parameter to the transmission apparatus recognition apparatus, the learning parameter expressing the learned model generated by the learner,
the third generator generates the sample feature from the radio feature using the learning parameter when the receiver receives a signal.

9. A transmission apparatus recognition method in a transmission apparatus recognition apparatus including a receiver configured to receive a signal wirelessly transmitted from a transmission apparatus, the method comprising:
recognizing the transmission apparatus by calculating a degree of similarity between a sample feature generated from a received signal received by the receiver and a template feature registered in advance and by comparing the degree of similarity with a recognition threshold value; and
first generating a template feature from a sample feature that failed to be recognized in the recognizing.

10. The transmission apparatus recognition method according to claim 9, further comprising second generating a radio feature from a signal received by the receiver,
wherein the recognizing includes third generating the sample feature by extracting the sample feature, as a feature having a lower dimension than the radio feature, from the radio feature.

11. The transmission apparatus recognition method according to claim 10, wherein
the recognizing includes learning to generate a learned model for extracting the sample feature from the radio feature, and
the third generating the sample feature from the radio feature using the learned model when the receiver receives a signal.

12. The transmission apparatus recognition method according to claim 10, wherein the recognizing includes determining the recognition threshold value based on a first predetermined target error rate.

13. The transmission apparatus recognition method according to claim 9, wherein
the first generating includes:
temporarily holding a sample feature that has failed to be recognized in the recognizing; and
generating a template feature from the sample features temporarily held.

14. The transmission apparatus recognition method according to claim 13, wherein
the first generating includes:
calculating degrees of similarity between sample features temporary held every predetermined period of time and grouping those whose degrees of similarity are equal to or greater than a registration threshold value, and
for each group grouped in the grouping, generating a template feature from a plurality of sample features included in the group.

15. The transmission apparatus recognition method according to claim 14, wherein the first generating includes determining the registration threshold value based on a second predetermined target error rate.

* * * * *